United States Patent
Yano et al.

(10) Patent No.: US 8,327,065 B2
(45) Date of Patent: Dec. 4, 2012

(54) MEMORY SYSTEM, CONTROLLER, AND METHOD OF CONTROLLING MEMORY SYSTEM

(75) Inventors: Hirokuni Yano, Tokyo (JP); Shinichi Kanno, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 716 days.

(21) Appl. No.: 12/566,236

(22) Filed: Sep. 24, 2009

(65) Prior Publication Data

US 2010/0169553 A1  Jul. 1, 2010

(30) Foreign Application Priority Data

Dec. 27, 2008  (JP) .................................. 2008-335543

(51) Int. Cl.
*G06F 12/00* (2006.01)
(52) U.S. Cl. ................. 711/103; 711/105; 711/E12.001
(58) Field of Classification Search .......................... None
See application file for complete search history.

(56) References Cited

U.S. PATENT DOCUMENTS

| | | |
|---|---|---|
| 2009/0216937 A1 | 8/2009 | Yasufuku |
| 2009/0222616 A1 | 9/2009 | Yano et al. |
| 2009/0222617 A1 | 9/2009 | Yano et al. |
| 2009/0222628 A1 | 9/2009 | Yano et al. |
| 2009/0222629 A1 | 9/2009 | Yano et al. |
| 2009/0222636 A1 | 9/2009 | Yano et al. |
| 2009/0228642 A1 | 9/2009 | Yano et al. |
| 2009/0235015 A1 | 9/2009 | Hatsuda et al. |
| 2009/0235016 A1 | 9/2009 | Yano et al. |
| 2009/0240871 A1 | 9/2009 | Yano et al. |
| 2009/0241010 A1 | 9/2009 | Yano et al. |
| 2009/0248964 A1 | 10/2009 | Yano et al. |

FOREIGN PATENT DOCUMENTS

| | | |
|---|---|---|
| JP | 5-342891 | 12/1993 |
| JP | 10-11360 | 1/1998 |
| JP | 2000-285019 | 10/2000 |
| JP | 3688835 | 6/2005 |
| JP | 2007-11929 | 1/2007 |
| JP | 2008-146255 | 6/2008 |

OTHER PUBLICATIONS

U.S. Appl. No. 12/883,796, filed Sep. 16, 2010, Fukutomi, et al.
U.S. Appl. No. 12/884,844, filed Sep. 17, 2010, Yano, et al.
U.S. Appl. No. 12/393,654, filed Feb. 26, 2009, Fukutomi, et al.
U.S. Appl. No. 12/396,006, filed Mar. 2, 2009, Sato, et al.
U.S. Appl. No. 12/395,811, filed Mar. 2, 2009, Fukutomi, et al.
U.S. Appl. No. 12/398,608, filed Mar. 5, 2009, Fukutomi, et al.
U.S. Appl. No. 12/513,860, filed May 7, 2009, Nagadomi, et al.
U.S. Appl. No. 12/551,213, filed Aug. 31, 2009, Kanno, et al.
U.S. Appl. No. 12/529,126, filed Aug. 28, 2009, Yano, et al.
U.S. Appl. No. 12/529,145, filed Aug. 28, 2009, Yano, et al.

(Continued)

*Primary Examiner* — Charles Rones
*Assistant Examiner* — Arvind Talukdar
(74) *Attorney, Agent, or Firm* — Oblon, Spivak, McClelland, Maier & Neustadt, L.L.P.

(57) ABSTRACT

A memory system according to an embodiment of the present invention includes a volatile first storing unit, a nonvolatile second storing unit, a controller that transfers data between a host apparatus and the second storing unit via the first storing unit. The memory system monitors whether data written from the host apparatus in the first storing unit has a specific pattern in management units. When data to be flushed to the second storing unit has the specific pattern, the memory system set an invalid address value that is not in use in the second storing unit to the data.

20 Claims, 17 Drawing Sheets

OTHER PUBLICATIONS

U.S. Appl. No. 12/529,139, filed Aug. 28, 2009, Yano, et al.
U.S. Appl. No. 12/529,193, filed Aug. 31, 2009, Yano, et al.
U.S. Appl. No. 12/529,223, filed Aug. 31, 2009, Yano, et al.
U.S. Appl. No. 12/529,127, filed Aug. 28, 2009, Yano, et al.
U.S. Appl. No. 12/529,270, filed Aug. 31, 2009, Yano, et al.
U.S. Appl. No. 12/529,192, filed Aug. 31, 2009, Yano, et al.
U.S. Appl. No. 12/529,282, filed Aug. 31, 2009, Hida, et al.
U.S. Appl. No. 12/529,227, filed Aug. 31, 2009, Yano, et al.
U.S. Appl. No. 12/529,228, filed Aug. 31, 2009, Yano, et al.
U.S. Appl. No. 12/552,330, filed Sep. 2, 2009, Yano, et al.
U.S. Appl. No. 12/529,473, filed Sep. 1, 2009, Nagadomi, et al.
U.S. Appl. No. 12/529,235, filed Aug. 31, 2009, Yano, et al.
U.S. Appl. No. 12/552,422, filed Sep. 2, 2009, Kitsunai, et al.
U.S. Appl. No. 12/530,467, filed Sep. 9, 2009, Yano, et al.
U.S. Appl. No. 12/566,236, filed Sep. 24, 2009, Yano, et al.
John L. Hennessy, et al., "Computer Organization and Design", The Hardware/ Software Interface, Morgan Kaufmann Publishers, Inc., Second Edition, Aug. 31, 2004, 3 pages.
U.S. Appl. No. 13/237,396, filed Sep. 20, 2011, Morita.
U.S. Appl. No. 13/238,675, filed Sep. 21, 2011, Norimatsu, et al.
Office Action issued Mar. 9, 2011, in Korean Patent Application No. 10-2009-0089090.
U.S. Appl. No. 12/713,631, filed Feb. 26, 2010, Fukutomi, et al.
U.S. Appl. No. 13/052,146, filed Mar. 21, 2011, Ootsuka, et al.
U.S. Appl. No. 12/555,274, filed Sep. 8, 2009, Kanno, et al.
U.S. Appl. No. 13/326,872, filed Dec. 15, 2011, Hirao, et al.
U.S. Appl. No. 13/328,471, filed Dec. 16, 2011, Yano, et al.

MEMORY SYSTEM, CONTROLLER, AND METHOD OF CONTROLLING MEMORY SYSTEM

CROSS-REFERENCE TO RELATED APPLICATIONS

This application is based upon and claims the benefit of priority from the prior Japanese Patent Application No. 2008-335543, filed on Dec. 27, 2008; the entire contents of which are incorporated herein by reference.

BACKGROUND OF THE INVENTION

1. Field of the Invention

The present invention relates to a memory system having a nonvolatile semiconductor memory, a controller, and a method of controlling the memory system.

2. Description of the Related Art

As an external storage device used in a computer system, an SSD (Solid State Drive) mounted with a nonvolatile semiconductor memory such as a NAND-type flash memory attracts attention. The flash memory has advantages such as high speed and light weight compared with a magnetic disk device.

The SSD includes a plurality of flash memory chips, a controller that performs read/write control for the respective flash memory chips in response to a request from a host apparatus, a buffer memory for performing data transfer between the respective flash memory chips and the host apparatus, a power supply circuit, and a connection interface to the host apparatus (e.g., Japanese Patent No. 3688835).

Examples of the nonvolatile semiconductor memory include nonvolatile semiconductor memories in which a unit of erasing, writing, and readout is fixed such as a nonvolatile semiconductor memory that, in storing data, once erases the data in block units and then performs writing and a nonvolatile semiconductor memory that performs writing and readout in page units in the same manner as the NAND-type flash memory.

On the other hand, a unit for a host apparatus such as a personal computer to write data in and read out the data from a secondary storage device such as a hard disk is called sector. The sector is set independently from a unit of erasing, writing, and readout of a semiconductor memory.

For example, whereas a size of a block (a block size) of the nonvolatile semiconductor memory is 512 kB and a size of a page (a page size) thereof is 4 kB, a size of a sector (a sector size) of the host apparatus is set to 512 B.

In this way, the unit of erasing, writing, and readout of the nonvolatile semiconductor memory may be larger than the unit of writing and readout of the host apparatus.

Meanwhile, data to be recorded in the host apparatus such as a personal computer has temporal locality and spatial locality (e.g., David A. Patterson and John L. Hennessy, "Computer Organization and Design: The Hardware/Software Interface", Morgan Kaufmann Pub, 2004 Aug. 31). Because of this characteristic, if data is directly recorded according to an address designated by an external apparatus, rewrite processing, that is, erase processing, is concentrated in a specific area in a short time. As a result, the number of times of the erase processing in the specific area disproportionately increases. Therefore, in the NAND flash memory, processing called wear leveling for equally distributing data update sections in a semiconductor memory is performed (see, for example, Japanese Patent Application Laid-open No. 2008-146255).

BRIEF SUMMARY OF THE INVENTION

A memory system according to an embodiment of the present invention comprises: a volatile first storing unit; a nonvolatile second storing unit; and a controller that transfers data between a host apparatus and the second storing unit via the first storing unit, wherein the first storing unit stores therein first management information used for correlating a logical address designated by the host apparatus with a data storage location in the first storing unit, and second management information used for correlating the logical address and a data storage location in the second storing unit, the controller further includes a read-write control unit that performs data reading and data writing between the host apparatus and the first storing unit and between the first storing unit and the second storing unit, by using the first management information and the second management information; a management-information updating unit that updates the first or the second management information when the data storage location in the first or the second storing unit is changed by the read-write control unit; and a data monitoring unit that monitors whether data written in the first storing unit from the host apparatus has a specific pattern with respect to each specific management unit, wherein when the data monitoring unit detects that data having the specific pattern is written in the first storing unit, the management-information updating unit adds specific pattern identification information indicating that the data has the specific pattern to the first management information corresponding to the data, and when data written in the first storing unit is flushed to the second storing unit, and if the specific pattern identification information is added for the data, the read-write control unit does not write the data in the second storing unit, and the management-information updating unit sets an invalid address value to the second management information corresponding to the data.

A controller that transfers data between a host apparatus and a nonvolatile second storing unit via a volatile first storing unit according to an embodiment of the present invention comprises: a read-write control unit that performs data reading and data writing between a host apparatus and the first storing unit and between the first storing unit and the second storing unit, by using first management information used for correlating a logical address designated by the host apparatus with a data storage location in the first storing unit and second management information used for correlating the logical address with a data storage location in the second storing unit; a management-information updating unit that updates the first or the second management information when the data storage location in the first or the second storing unit is changed by the read-write control unit; and a data monitoring unit that monitors whether data written in the first storing unit from the host apparatus has a specific pattern with respect to each specific management unit, wherein when the data monitoring unit detects that data having the specific pattern is written in the first storing unit, the management-information updating unit adds specific pattern identification information indicating that the data has the specific pattern to the first management information corresponding to the data, and when data written in the first storing unit is flushed to the second storing unit, and if the specific pattern identification information is added for the data, the read-write control unit does not write the data in the second storing unit, and the management-information updating unit sets an invalid address value to the second management information corresponding to the data.

A method of controlling a memory system that includes a volatile first storing unit and a nonvolatile second storing unit according to an embodiment of the present invention comprises: transferring data between a host apparatus and the second storing unit via the first storing unit; performing data reading and data writing between a host apparatus and the first storing unit and between the first storing unit and the second storing unit, by using first management information being used for correlating a logical address designated by the host apparatus with a data storage location in the first storing unit and second management information being used for correlating the logical address with a data storage location in the second storing unit; updating the first or the second management information when the data storage location in the first or the second storing unit is changed at the performing; monitoring whether data written in the first storing unit from the host apparatus has a specific pattern with respect to each specific management unit; adding, when it is detected at the monitoring that data having the specific pattern is written in the first storing unit, specific pattern identification information indicating that the data has the specific pattern to first management information corresponding to the data; and setting, when data written in the first storing unit is flushed to the second storing unit and if the specific pattern identification information is added for the data, an invalid address value to the second management information corresponding to the data without writing the data in the second storing unit.

DETAILED DESCRIPTION OF THE INVENTION

Figure 1:
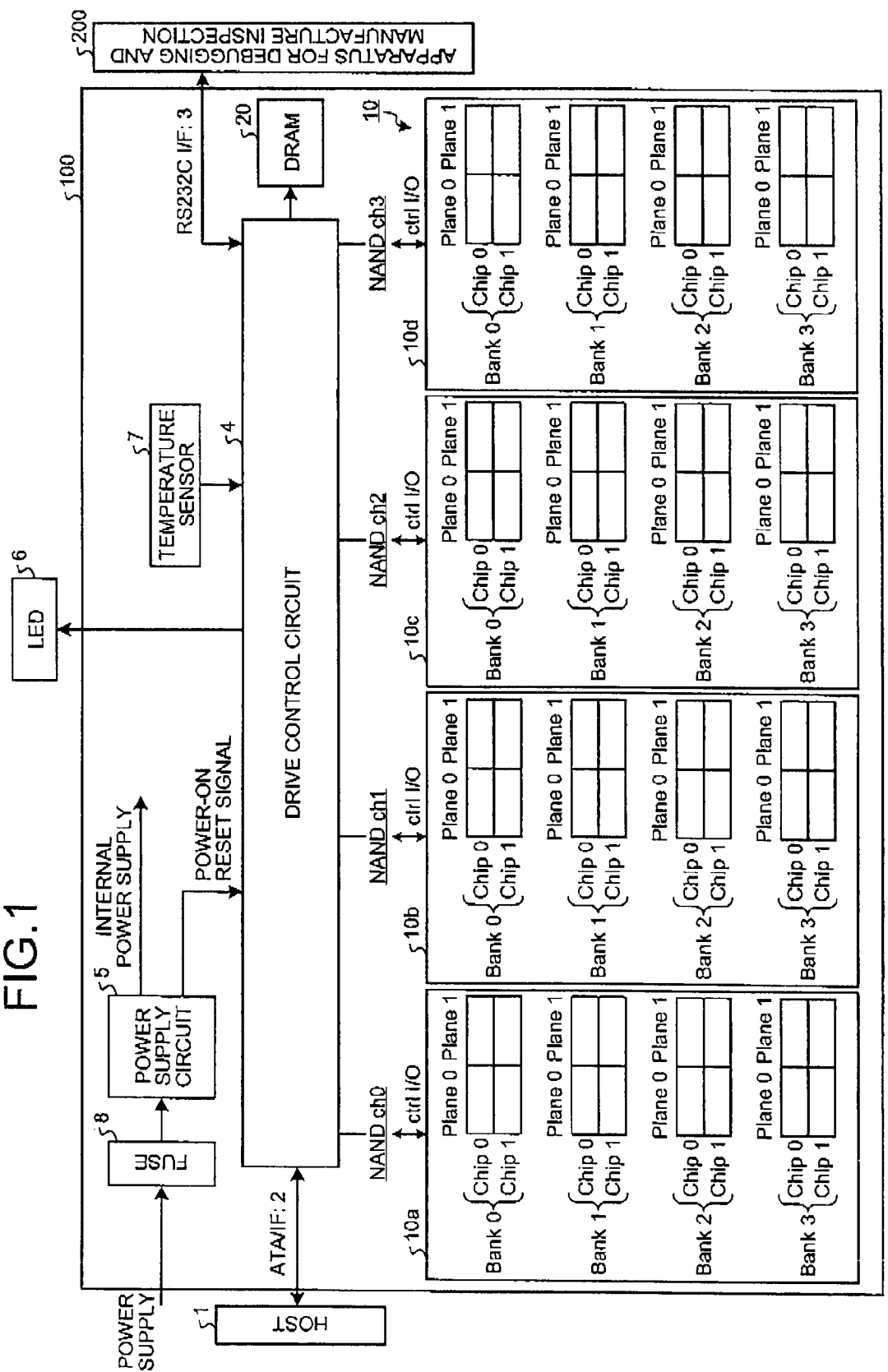
FIG. 1 is a block diagram of a configuration example of an SSD.

In the wear leveling processing, a logical address designated by the host apparatus is translated into a physical address of a nonvolatile semiconductor memory such that data update sections are equally distributed, so that a physical storage location where the data is to be stored is dynamically changed. Accordingly, the number of times of write processing in the entire nonvolatile semiconductor memory can be equalized. As a result, degradation of the nonvolatile semiconductor memory caused by increase in the number of times of the write processing in a specific area can be prevented.

However, in the conventional technology, only the wear leveling has been a measure for preventing the degradation of the nonvolatile semiconductor memory caused by increase in the number of times of the write processing. Therefore, demands for other measures for further preventing degradation of the nonvolatile semiconductor memory is increasingly growing.

Exemplary embodiments of the present invention are explained in detail below with reference to the accompanying drawings. The present invention is not limited by the embodiments. In the following explanation, components having the same functions and configurations are denoted with the same reference numerals and signs. Redundant explanation of the components is made only when necessary.

First, terms used in this specification are defined.

Physical page: A unit that can be collectively written in and read out from a NAND-type flash memory.

Logical page: A writing and readout unit set in the SSD. The logical page is formed of one or more physical pages.

Physical block: A minimum unit that can be independently erased in the NAND-type flash memory. The physical block is formed of a plurality of physical pages.

Logical block: An erasing unit set in the SSD. The logical block is formed of one or more physical blocks. The logical block contains a plurality of logical pages.

Sector: A minimum access unit from a host. A sector size is, for example, 512 B.

Cluster: A management unit for managing "small data (fine grained data)" in the SSD. A cluster size is equal to or larger than the sector size. The cluster size can be set to be equal to a data management unit of a file system adopted by an OS on a host side or can be set to be equal to the logical page size. For example, the cluster size can be set such that a size twice or larger natural number times as large as the cluster size is the logical page size.

Track: A management unit for managing "large data (coarse grained data)" in the SSD. A track size is set such that a size twice or larger natural number times as large as the cluster size is the track size. For example, the track size can be set to be equal to the logical block size.

Free block (FB): A logical block that does not contain valid data and for which a use is not allocated. There are the following two types of the FB, that is, an CFB and an FFB.

Complete free block (CFB): An FB for which erasing operation needs to be performed for reuse. Once the erasing operation is finished, writing can be performed from a logical page at the head of a logical block.

Fragment free block (FFB): An FB in which a free logical page is remained and that can be reused without being subjected to the erasing operation. Writing can be performed in the remaining free logical page.

Bad block (BB): A physical block on the NAND-type flash memory that cannot be used as a storage area because of a large number of errors. For example, a physical block for which an erasing operation is not normally finished is registered as the bad block BB.

Writing efficiency: A statistical value of an erasing amount of the logical block with respect to a data amount written from the host in a specific period. As the writing efficiency is smaller, a wear degree of the NAND-type flash memory is smaller.

Valid cluster: A cluster that stores latest data (cluster-sized data) corresponding to a logical address.

Invalid cluster: A cluster that stores non-latest data (cluster-sized data) not to be referred as a result that data having an identical logical address is written in other storage area.

Valid track: A track that stores latest data (track-sized data) corresponding to a logical address.

Invalid track: A track that stores non-latest data (track-sized data) not to be referred as a result that data having an identical logical address is written in other storage area.

MLC (Multi Level Cell) mode: A mode in which writing is normally performed by using an upper page and a lower page in the NAND-type flash memory in which multiple values can be stored. The logical block for the MLC mode is formed of one or more physical blocks to be used in the MLC mode.

Pseudo SLC (Single Level Cell) mode: A mode in which writing is performed by using only a lower page in the NAND-type flash memory in which multiple values can be stored. The logical block for the pseudo SLC mode is formed of one or more physical blocks to be used in the pseudo SLC mode. A physical block that has been used once in the pseudo SLC mode can be reused in the MLC mode after being subjected to the erasing operation.

[First Embodiment]

FIG. 1 is a block diagram of a configuration example of an SSD (Solid State Drive) 100. The SSD 100 is connected to a host apparatus (hereinafter, referred to as "host") 1 such as a personal computer or a CPU core via a memory connection interface such as an ATA interface (ATA I/F) 2 and functions as an external storage of the host 1. The SSD 100 can transmit data to and receive data from an apparatus for debugging and manufacture inspection 200 via a communication interface 3 such as an RS232C interface (RS232C I/F). The SSD 100 includes a NAND-type flash memory (hereinafter abbreviated as NAND memory) 10 as a nonvolatile semiconductor memory, a drive control circuit 4 as a controller, a DRAM 20 as a volatile semiconductor memory, a power supply circuit 5, an LED for state display 6, a temperature sensor 7 that detects the temperature in a drive, and a fuse 8.

The power supply circuit 5 generates a plurality of different internal DC power supply voltages from external DC power supplied from a power supply circuit on the host 1 side and supplies these internal DC power supply voltages to respective circuits in the SSD 100. The power supply circuit 5 detects a rising edge of an external power supply, generates a power-on reset signal, and supplies the power-on reset signal to the drive control circuit 4. The fuse 8 is provided between the power supply circuit on the host 1 side and the power supply circuit 5 in the SSD 100. When an overcurrent is supplied from an external power supply circuit, the fuse 8 is disconnected to prevent malfunction of the internal circuits.

The NAND memory 10 has four parallel operation elements 10a to 10d that perform four parallel operations. The four parallel operation elements 10a to 10d are connected to the drive control circuit 4 via four corresponding channels (ch 0 to ch 3). Each of the four parallel operation elements 10a to 10d includes a plurality of banks (in the first embodiment, four banks, i.e., Bank 0 to Bank 3) that enable bank interleave. Each of the banks includes a plurality of NAND memory chips (in the first embodiment, two memory chips, i.e., Chip 0 and Chip 1). Each of the memory chips is divided into, for example, two areas (District) as Plane 0 and Plane 1 each containing a plurality of physical blocks. The Plane 0 and the Plane 1 include respective peripheral circuits that are independent of each other (e.g., a row decoder, a column decoder, a page buffer, and a data cache) and can perform erasing/writing/reading in parallel by using a double speed mode. In this manner, each of the NAND memory chips of the NAND memory 10 can enable a parallel operation by using a plurality of the channels, a bank interleaving operation by using a plurality of the banks, and a parallel operation by using a plurality of planes in the double speed mode. Each of the memory chips can be divided into, for example, four planes or can be undivided.

The DRAM 20 functions as a cache for data transfer between the host 1 and the NAND memory 10 and a memory for a work area. Data to be stored in an area corresponding to the memory for the work area in the DRAM 20 is, for example, a master table (snapshot) loaded from various management tables stored in the NAND memory 10 (to be described later) at the time of start-up, and log information indicating an update difference resulted from updates of the management tables. An FeRAM (Ferroelectric Random Access Memory), MRAM (Magnetoresistive Random Access Memory), or PRAM (Phase-change Random Access Memory) can be used instead of the DRAM 20. The drive control circuit 4 performs data transfer control between the host 1 and the NAND memory 10 via the DRAM 20 and controls the respective components in the SSD 100. The drive control circuit 4 supplies a signal for status display to the LED for state display 6. The drive control circuit 4 also has a function of receiving a power-on reset signal from the power supply circuit 5 and supplying a reset signal and a clock signal to respective units in the own circuit and the SSD 100.

Figure 2A:
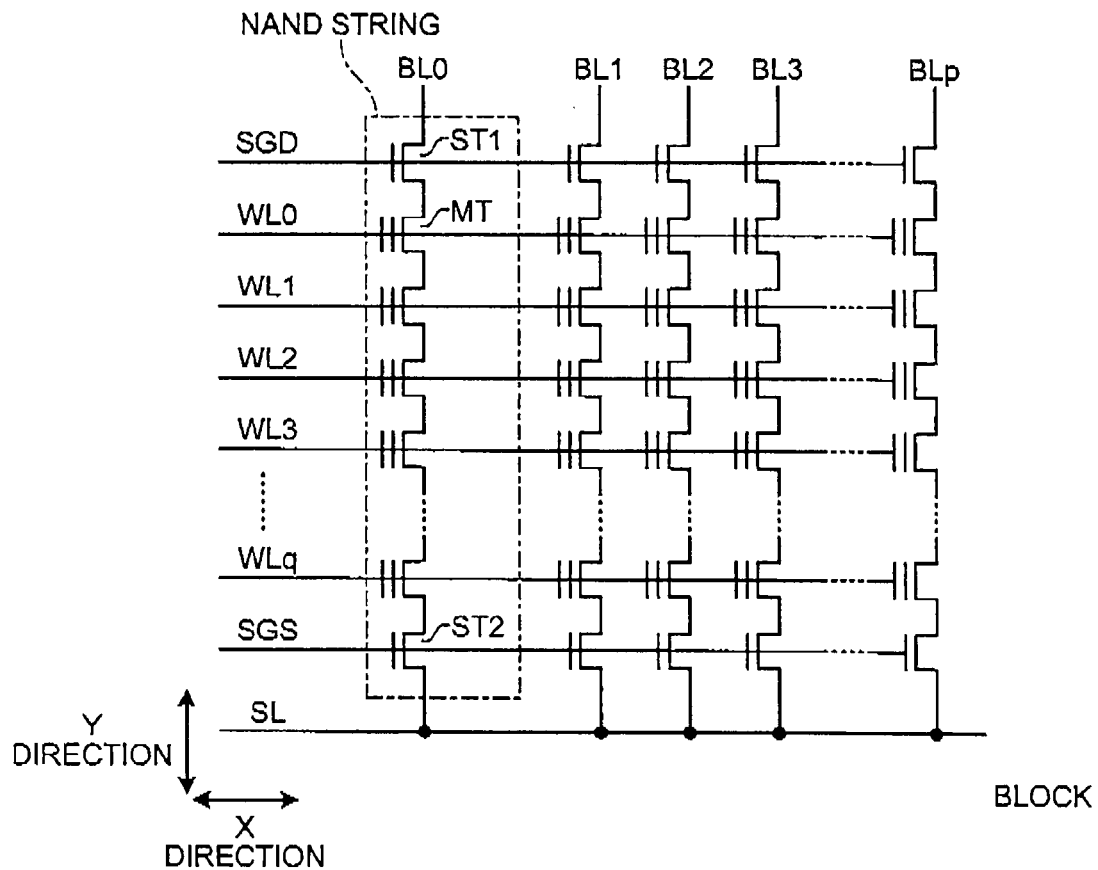
FIG. 2A is an equivalent circuit diagram of a configuration example of one physical block included in a NAND memory chip.

Each of the NAND memory chips is configured by arraying a plurality of physical blocks as units of data erasing. FIG. 2A is an equivalent circuit diagram of a configuration example of one physical block included in the NAND memory chip. Each physical block includes (p+1) NAND strings arrayed in order along an X direction (p is an integer equal to or larger than 0). A drain of a selection transistor ST1 included in each of the (p+1) NAND strings is connected to bit lines BL0 to BLp and a gate thereof is connected to a selection gate line SGD in common. A source of a selection transistor ST2 is connected to a source line SL in common and a gate thereof is connected to a selection gate line SGS in common.

Each of memory cell transistors MT includes a MOSFET (Metal Oxide Semiconductor Field Effect Transistor) including the stacked gate structure formed on a semiconductor substrate. The stacked gate structure includes a charge storage layer (a floating gate electrode) formed on the semiconductor substrate via a gate insulating film and a control gate electrode formed on the charge storage layer via an inter-gate insulating film. Threshold voltage changes according to the number of electrons accumulated in the floating gate electrode. The memory cell transistor MT stores data according to a difference in the threshold voltage. The memory cell transistor MT can be configured to store one bit or can be configured to store multiple values (data equal to or larger than two bits).

The memory cell transistor MT is not limited to the structure having the floating gate electrode and can be the structure such as a MONOS (Metal-Oxide-Nitride-Oxide-Silicon) type that can adjust a threshold by causing a nitride film interface as a charge storage layer to trap electrons. Similarly, the memory cell transistor MT of the MONOS structure can be configured to store one bit or can be configured to store multiple values (data equal to or larger than two bits).

In each of the NAND strings, (q+1) memory cell transistors MT are arranged between the source of the selection transistor ST1 and the drain of the selection transistor ST2 such that current paths thereof are connected in series. In other words, the memory cell transistors MT are connected in series in a Y direction such that adjacent ones of the memory cell transistors MT share a diffusion region (a source region or a drain region).

Control gate electrodes of the memory cell transistors MT are connected to word lines WL0 to WLq, respectively, in order from the memory cell transistor MT located on the most drain side. Therefore, a drain of the memory cell transistor MT connected to the word line WL0 is connected to the source of the selection transistor ST1. A source of the memory cell transistor MT connected to the word line WLq is connected to the drain of the selection transistor ST2.

The word lines WL0 to WLq connect the control gate electrodes of the memory cell transistors MT in common among the NAND strings in the physical block. In other words, the control gates of the memory cell transistors MT present in an identical row in the block are connected to an identical word line WL. (p+1) memory cell transistors MT connected to the identical word line WL is treated as one page (physical page). Data writing and data readout are performed by each physical page.

The bit lines BL0 to BLp connect drains of selection transistors ST1 in common among the blocks. In other words, the NAND strings present in an identical column in a plurality of blocks are connected to an identical bit line BL.

Figure 2B:
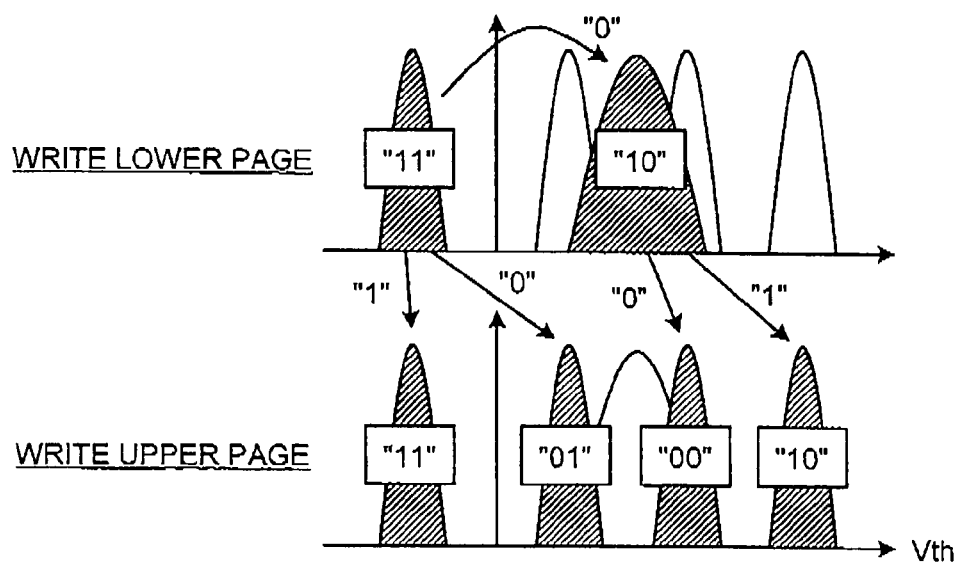
FIG. 2B is a schematic diagram illustrating a threshold distribution in a quaternary data storage mode for storing two bits in one memory cell transistor MT.

FIG. 2B is a schematic diagram of a threshold distribution, for example, in a quaternary data storage mode for storing two bits in one memory cell transistor MT. In the quaternary data storage mode, any one of quaternary data "xy" defined by upper page data "x" and lower page data "y" can be stored in the memory cell transistor MT.

As the quaternary data "xy", for example, "11", "01", "00", and "10" are allocated in order of threshold voltages of the memory cell transistor MT. The data "11" is an erased state in which the threshold voltage of the memory cell transistor MT is negative. A data allocation rule is not limited to this example. For example, it is applicable to store three or more bits in one memory cell transistor MT.

In a lower page writing operation, the data "10" is selectively written in the memory cell transistor MT having the data "11" (in the erased state) according to the writing of the lower bit data "y". A threshold distribution of the data "10" before upper page writing is located about in the middle of threshold distributions of the data "01" and the data "00" after the upper page writing and can be broader than a threshold distribution after the upper page writing. In a upper page writing operation, writing of upper bit data "x" is selectively applied to a memory cell of the data "11" and a memory cell of the data "10". The data "01" and the data "00" are written in the memory cells. In the pseudo SLC mode, writing is performed by using only a lower page. Lower page writing is performed at a faster speed than the upper page writing.

Figure 3:
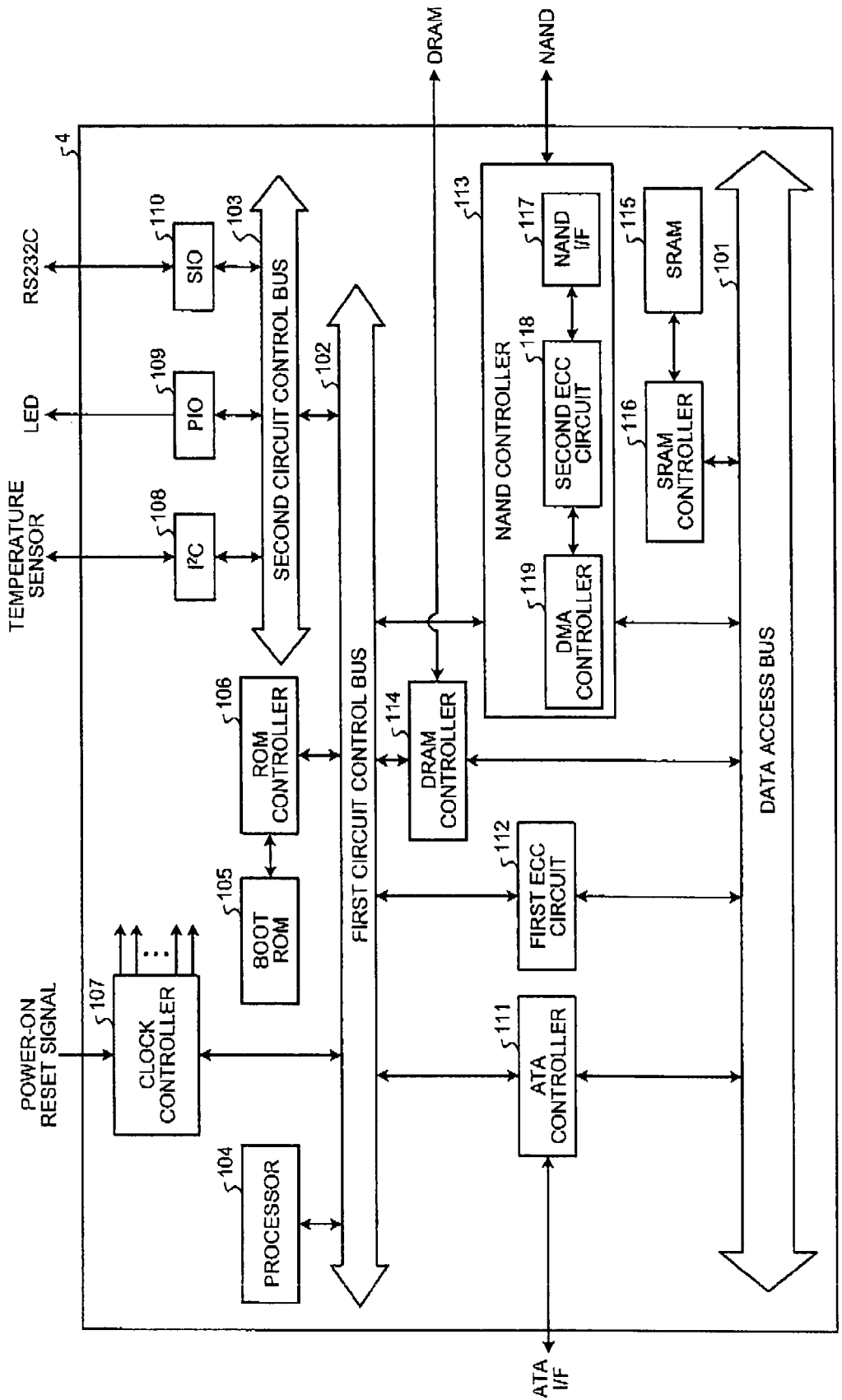
FIG. 3 is a block diagram of a hardware internal configuration example of a drive control circuit.

FIG. 3 is a block diagram of a hardware internal configuration example of the drive control circuit 4. The drive control circuit 4 includes a data access bus 101, a first circuit control bus 102, and a second circuit control bus 103. A processor 104 that controls the entire drive control circuit 4 is connected to the first circuit control bus 102. A boot ROM 105, in which a boot program for booting respective management programs (FW: firmware) stored in the NAND memory 10 is stored, is connected to the first circuit control bus 102 via a ROM controller 106. A clock controller 107 that receives the power-on rest signal from the power supply circuit 5 shown in FIG. 1 and supplies a reset signal and a clock signal to the respective units is connected to the first circuit control bus 102.

The second circuit control bus 103 is connected to the first circuit control bus 102. An $I^2C$ circuit 108 for receiving data from the temperature sensor 7 shown in FIG. 1, a parallel IO (PIO) circuit 109 that supplies a signal for status display to the LED for state display 6, and a serial IO (SIO) circuit 110 that controls the RS232C I/F 3 are connected to the second circuit control bus 103.

An ATA interface controller (ATA controller) 111, a first ECC (Error Checking and Correction) circuit 112, a NAND controller 113, and a DRAM controller 114 are connected to both the data access bus 101 and the first circuit control bus 102. The ATA controller 111 transmits data to and receives data from the host 1 via the ATA interface 2. An SRAM 115 used as a data work area and a firm ware expansion area is connected to the data access bus 101 via an SRAM controller 116. When the firmware stored in the NAND memory 10 is started, the firmware is transferred to the SRAM 115 by the boot program stored in the boot ROM 105.

The NAND controller 113 includes a NAND I/F 117 that performs interface processing for interface with the NAND memory 10, a second ECC circuit 118, and a DMA controller for DMA transfer control 119 that performs access control between the NAND memory 10 and the DRAM 20. The second ECC circuit 118 performs encode of a second correction code and performs encode and decode of a first error correction code. The first ECC circuit 112 performs decode of a second error correction code. The first error correction code and the second error correction code are, for example, a hamming code, a BCH (Bose Chaudhuri Hocqenghem) code, an RS (Reed Solomon) code, or an LDPC (Low Density Parity Check) code. Correction ability of the second error correction code is higher than correction ability of the first error correction code. An error correction technology as described above is disclosed in, for example, International Application No. PCT/JP2008/063344 and International Application No. PCT/JP2008/063345, which are filed by the same applicant as this application, and the entire contents of which are incorporated herein by reference.

As shown in FIG. 1, in the NAND memory 10, the four parallel operation elements 10a to 10d are connected in parallel to the NAND controller 112 in the drive control circuit 4 via four corresponding multiple-bit channels (4 ch), so that the four parallel operation elements 10a to 10d can operate in parallel. The NAND memory 10 for each of the channels is divided into four banks by which the bank interleave can be enabled. The Plane 0 and the Plane 1 in each memory chip can be accessed simultaneously. Therefore, processing such as write processing can be nearly simultaneously performed on eight physical blocks (i.e., 4 banks×2 planes) at a maximum for one channel.

Figure 4:
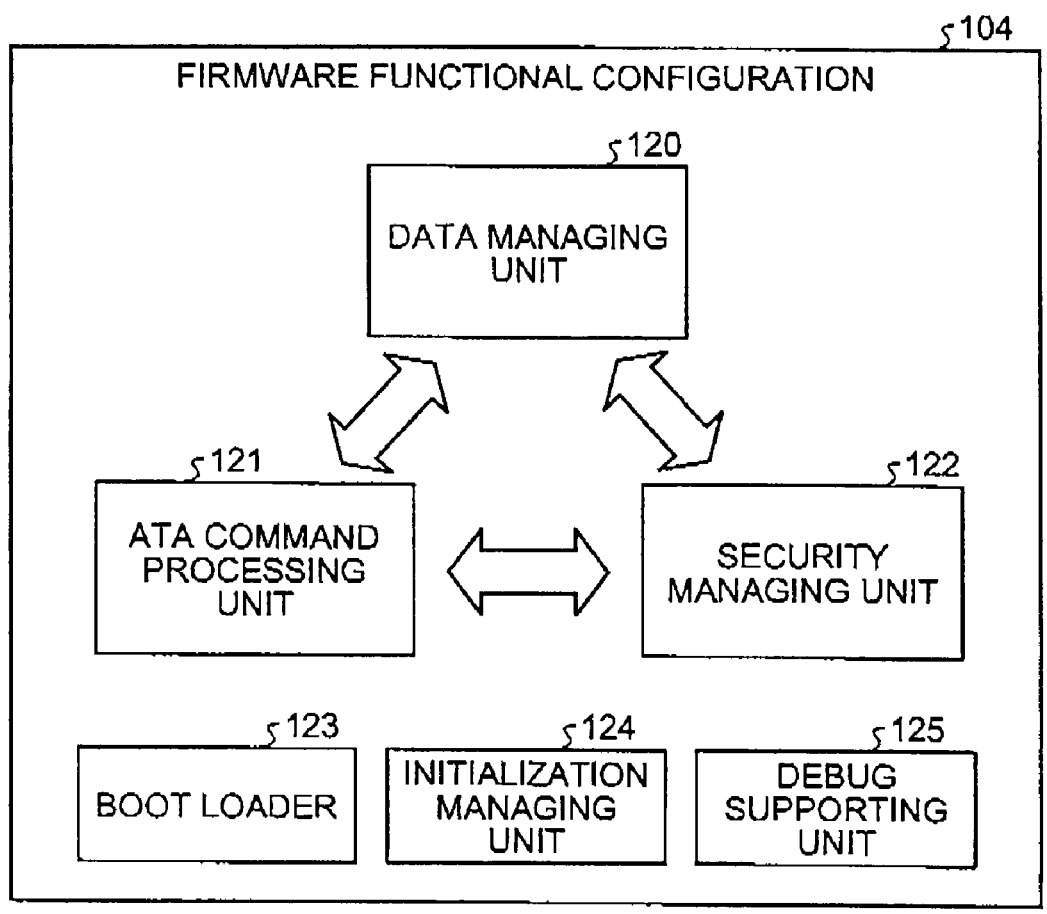
FIG. 4 is a block diagram of a functional configuration example of a processor.

FIG. 4 is a block diagram of a functional configuration example of firmware realized by the processor 104. Functions of the firmware realized by the processor 104 are roughly classified into a data managing unit 120, an ATA-command processing unit 121, a security managing unit 122, a boot loader 123, an initialization managing unit 124, and a debug supporting unit 125.

The data managing unit 120 controls data transfer between the NAND memory 10 and the DRAM 20 and various functions concerning the NAND memory 10 via the NAND controller 113 and the first ECC circuit 112. The ATA-command processing unit 121 performs data transfer processing between the DRAM 20 and the host 1 in cooperation with the data managing unit 120 via the ATA controller 111 and the DRAM controller 114. The security managing unit 122 manages various kinds of security information in cooperation with the data managing unit 120 and the ATA-command processing unit 121.

The boot loader 123 loads, when a power supply is turned on, the management programs (firmware) from the NAND memory 10 to the SRAM 115. The initialization managing unit 124 performs initialization of respective controllers and circuits in the drive control circuit 4. The debug supporting unit 125 processes data for debug supplied from the outside via the RS232C interface. The data managing unit 120, the ATA-command processing unit 121, and the security managing unit 122 are mainly functional units realized by the processor 104 executing the management programs stored in the SRAM 115.

In this embodiment, functions realized by the data managing unit 120 are mainly explained. The data managing unit 120 performs, for example, provision of functions that the ATA-command processing unit 121 requests the NAND memory 10 and the DRAM 20 functioning as storage devices to provide (in response to various commands such as a Write request, a Cache Flush request, and a Read request from the host), management of a correspondence relation between a logical address designated by the host 1 and a physical address of the NAND memory 10, protection of management information using snapshot and log, provision of fast and highly efficient data readout and writing functions using the DRAM 20 and the NAND memory 10, and ensuring of reliability of the NAND memory 10.

Figure 5:
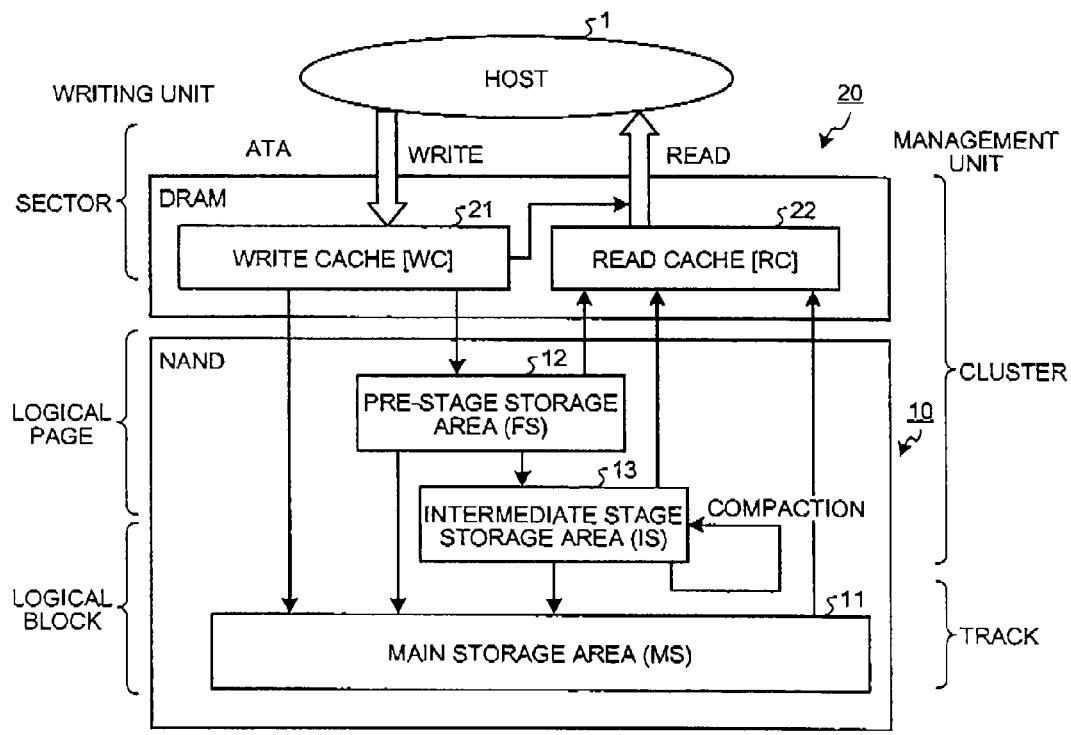
FIG. 5 is a block diagram of internal functional configurations of a NAND memory and a DRAM.

FIG. 5 is a diagram of functional blocks formed in the NAND memory 10 and the DRAM 20. A write cache (WC) 21 and a read cache (RC) 22 configured on the DRAM 20 are interposed between the host 1 and the NAND memory 10. The WC 21 temporarily stores Write data from the host 1. The RC 22 temporarily stores Read data from the NAND memory 10. The WC 21 and the RC 22 may be configured on different DRAM chips or other kind of memory chips described above.

The blocks in the NAND memory 10 are allocated to respective management areas of a pre-stage storage area (FS: Front Storage) 12, an intermediate stage storage area (IS: Intermediate Storage) 13, and a main storage area (MS: Main Storage) 11 by the data managing unit 120 in order to reduce an amount of erasing for the NAND memory 10 during writing. The FS 12 manages data from the WC 21 in cluster units, i.e., "small units" and stores small data (fine grained data) for a short period. The IS 13 manages data overflowing from the FS 12 in cluster units, i.e., "small units" and stores small data (fine grained data) for a long period. The MS 11 manages data from the WC 21, the FS 12, and the IS 13 in track units, i.e., "large units". A technology for allocating blocks in the NAND memory 10 to respective management areas to manage the blocks is disclosed in, for example, International Application No. PCT/JP08/073950 and International Application No. PCT/JP08/067600, which are filed by the same applicant as this application, and the entire contents of which are incorporated herein by reference.

Figure 6:
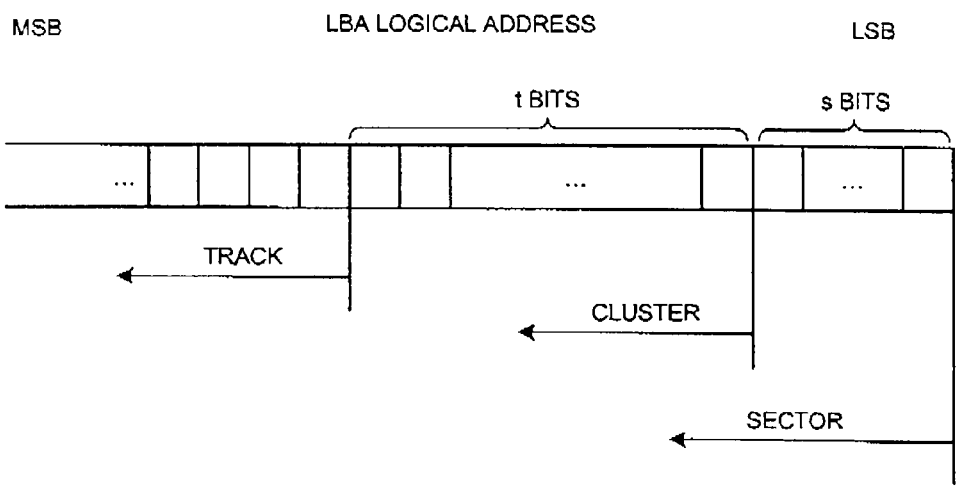
FIG. 6 is a schematic diagram illustrating an LBA logical address.

Specific functional configurations of the components shown in FIG. 5 are explained in detail below. When the host 1 performs Read or Write for the SSD 100, the host 1 inputs LBA (Logical Block Addressing) as a logical address via the ATA interface. The LBA is, as shown in FIG. 6, a logical address in which serial numbers from 0 are attached to sectors (size: 512 B). In the first embodiment, as management units for the WC 21, the RC 22, the FS 12, the IS 13, and the MS 11, which are the components shown in FIG. 5, a cluster address formed of bit strings equal to or higher in order than a low-order (s+1)th bit of the LBA and a track address formed of bit strings equal to or higher in order than a low-order (s+t+1)th bit of the LBA are defined. In the first embodiment, it is assumed that the track size and the logical block size are equal to each other. The logical block is a virtual block formed of a plurality of physical blocks provided on a chip of the NAND memory 10. In the first embodiment, the logical block is a unit of a collection of the same number of the physical blocks as parallel channels (in the first embodiment, 4 ch as shown in FIG. 1). Similarly, the logical page is a unit of a collection of the same number of physical pages as 4 ch. Furthermore, the logical block is formed of the physical blocks belonging to the same banks so that the bank interleave can be effectively performed.

Read Cache (RC) 22

The RC 22 is an area for temporarily storing, in response to a Read request from the host 1, Read data from the NAND memory 10 (the FS 12, the IS 13, and the MS 11). Data is transferred to the host 1 basically from the RC 22. When data is written from the WC 21 to the NAND memory 10, data having an identical logical address and stored in the RC 22 is invalidated.

Write Cache (WC) 21

The WC 21 is an area for temporarily storing, in response to a Write request from the host 1, Write data from the host 1. In the WC 21, management of data is performed in cluster units while writing of data and management of valid-data are performed in sector units. When resources in the WC 21 are run out, data stored in the WC 21 is flushed to the NAND memory 10. When data having a logical address identical to that of data in the RC 22 is written from the host 1, this latest data is stored in the WC 21. Therefore, if data having an identical logical address is stored in all of the WC 21, the RC 22, and the NAND memory 10, data in the WC 21 is the latest, data in the RC 22 is the second latest, and data in the NAND memory 10 is the oldest. Accordingly, when the data is sent to the host 1, the data stored in the WC 21 is prioritized.

Main Storage Area (MS) 11

In the MS 11, management of data is performed in track units. Most of user data is stored in the MS 11. A track containing a large number of valid clusters (i.e., high-density track) in the WC 21 is directly written from the WC 21 to the MS 11. Data that cannot be managed by the FS 12 and the IS 13 is also input to the MS 11. A track having LBA identical to that of the track input to the MS 11 is invalidated in a logical block, and then this logical block is released. A cluster belonging to a track having LBA identical to that of the track input to the MS 11 is invalidated in a logical block, and a logical block in which all clusters are invalidated is released. The MS 11 is formed of a plurality of logical blocks for the MLC mode. In the first embodiment, the track size and the logical block size are set to be equal to each other, so that the MS 11 need not perform additional recording processing that is performed in both the FS 12 and the IS 13 or compaction that is performed in the IS 13 (i.e., processing for generating a new logical block by collecting only valid clusters, and then deallocating invalid clusters). If the track size is set smaller than the logical block size, it is possible to perform, in the MS 11, the additional recording processing that is performed in both the FS 12 and the IS 13 or the compaction that is performed in the IS 13.

Pre-Stage Storage Area (FS) 12

The FS 12 is a buffer having a FIFO structure in which data is managed in cluster units. Input of data is performed in logical page units each containing a plurality of clusters. A track containing a small number of valid clusters (i.e., low-density track) in the WC 21 is primarily written in the FS 12. That is, the FS 12 has a FIFO structure in which the logical blocks are aligned in order of data writing. When a cluster having LBA identical to that of a cluster contained in the FS 12 is input to the FS 12, only an operation for invalidating the cluster that has been contained in the FS 12 is necessary and a rewriting operation is not necessary. A cluster having LBA identical to that of the cluster input to the FS 12 is invalidated in a logical block, and a logical block in which all clusters are invalidated is released. A cluster stored in a logical block at the last of the FIFO structure of the FS 12 is regarded as a cluster into which data is less likely to be written from the host 1. Therefore, a logical block having this cluster is moved in a unit to the IS 13 so that it is managed by the IS 13. In the first embodiment, the FS 12 is formed of a plurality of logical blocks for the pseudo SLC mode so that writing can be performed at an increased processing speed. However, the FS 12 can be formed of a plurality of logical blocks corresponding to the MLC mode. Data having a high update frequency is invalidated while passing through the FS 12, and only data having a low update frequency is flushed from the FS 12, so that the data having the high update frequency and the data having the low update frequency can be sorted out by the FS 12. As a result, likelihood that the IS 13 at the post stage is frequently required to execute compaction can be reduced.

Intermediate Stage Storage Area (IS) 13

The IS 13 is a buffer for storing a cluster into which data is less likely to be rewritten. In the IS 13, management of data is performed in cluster units in the same manner as the FS 12. When a cluster having LBA identical to that of a cluster contained in the IS 13 is input to the FS 12 or the IS 13, only an operation for invalidating the cluster that has been contained in the IS 13 is necessary and a rewriting operation is not necessary. In the IS 13, similar to the FS 12, a list structure is applied, in which logical blocks are aligned in chronological order of data writing (i.e., an order of movement from the FS 12). The IS 13 is different from the FS 12 in that compaction is executed thereon. When no space is remained in the IS 13 because of a management table, the compaction (i.e., to collect valid clusters and write back them in the IS 13) or defragmentation (i.e., to integrate clusters in the FS 12 and the IS 13 into a track and flash out the track to the MS 11) is performed. In the first embodiment, the IS 13 is formed of both the logical blocks for the MLC mode and the logical blocks for the pseudo SLC mode. In other words, while blocks moved from the FS 12 to the IS 13 are the logical blocks for the pseudo SLC mode, the logical blocks are rewritten into the logical blocks for the MLC mode when compaction is performed in the IS 13. If the FS 12 is formed of only logical blocks for the MLC mode, the IS 13 is also formed of only logical blocks for the MLC mode.

Figure 7:
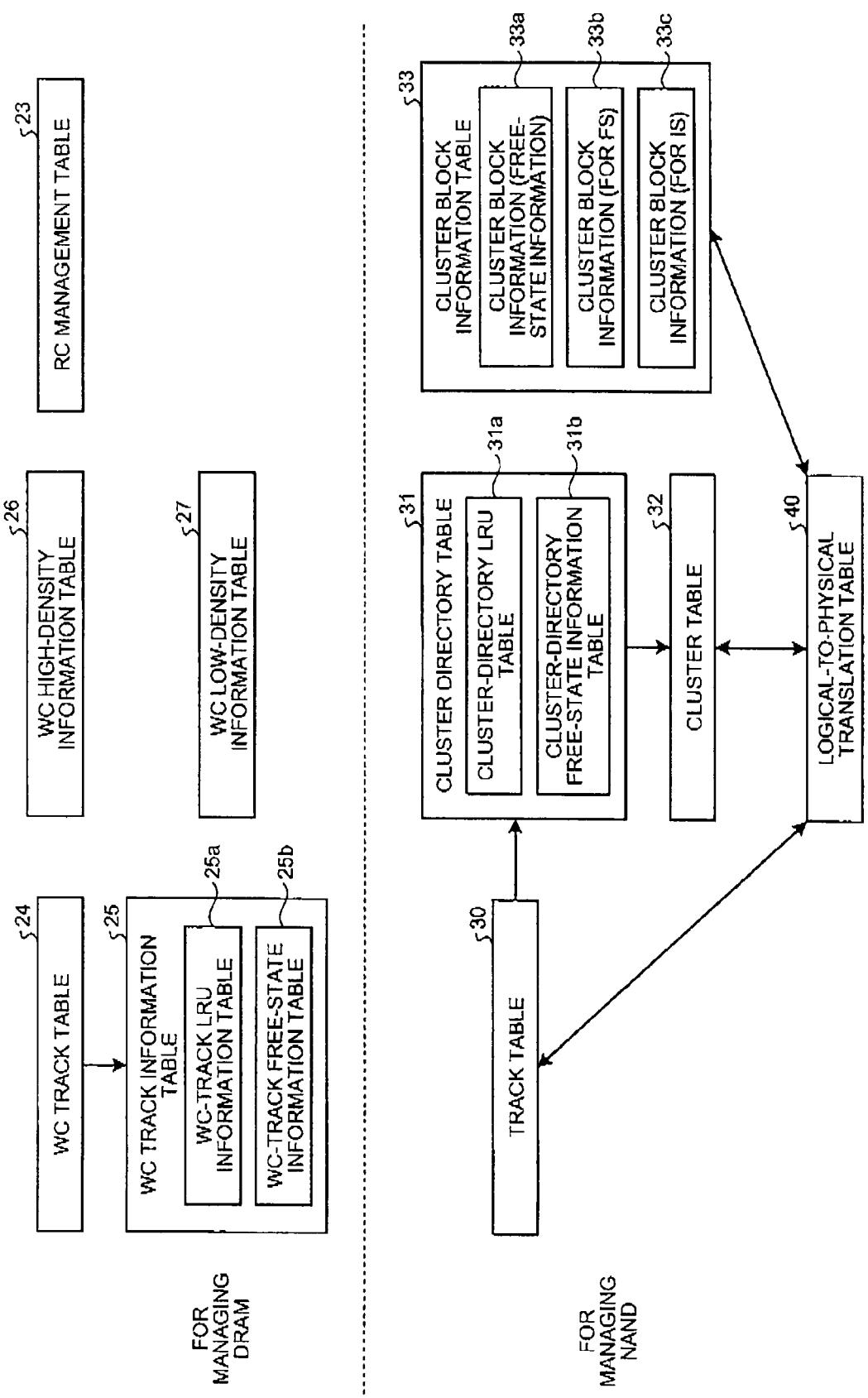
FIG. 7 is a schematic diagram of a configuration example of management tables in a data managing unit.

FIG. 7 illustrates management tables for the data managing unit 120 to control and manage the components shown in FIG. 5. Examples of tables for managing the DRAM 20 include a RC management table 23, a WC track table 24, a WC track information table 25, a WC high-density information table 26, and a WC low-density information table 27. Examples of tables for managing the NAND memory 10 include a track table 30, a cluster directory table 31, a cluster table 32, a cluster block information table 33, and a logical-to-physical translation table 40. The tables for managing the NAND memory 10 are classified into either a table to be referred to by using forward-lookup address translation or a table to be referred to by using reverse-lookup address translation. The forward-lookup address translation is a process of acquiring both a logical block address and a cluster position at which data is actually stored, based on LBA of the data. The reverse-lookup address translation is a process of acquiring LBA of data based on a logical block address and a cluster position of the data.

RC Management Table 23

The RC management table 23 is used for managing data transferred from the NAND memory 10 to the RC 22.

WC Track Table 24

The WC track table 24 is a hash table for looking up WC track information of data stored in the WC 21 based on LBA. The WC track table 24 contains LSB several bits of a track address of LBA as indices and a plurality of entries (tags) in association with each of the indices. In each tag, a track address of LBA and a pointer to WC track information corresponding to the track address are stored.

WC Track Information Table 25

The WC track information table 25 includes a WC-track LRU information table 25a for managing a temporal order of accessed WC track information based on LRU (Least Recently used) and in the form of a doubly-linked list and a WC-track free-state information table 25b for managing numbers assigned to WC track information indicating a WC track in a free state. When data is flushed from the WC 21 to the NAND memory 10, the least recently accessed track is extracted by using the WC-track LRU information table 25a.

The WC track information is associated with one of a plurality of tracks contained in the WC 21.

The WC track information contains, for example, (1) a track address of a track in the WC 21, the number of valid clusters in the track in the WC 21, information indicating whether each cluster in the WC 21 is valid, intra-WC cluster position information indicating a position of each cluster within the WC 21, (2) information indicating what sector contains valid data among a plurality of sectors contained in one cluster (i.e., sector bitmap), and (3) track status information (e.g., valid, invalid, data transfer from ATA, or writing in NAND). In the WC track information described above, LSB (t) bits corresponding to a cluster address in own track is managed at a storage location of a valid cluster. However, any methods of managing the cluster address can be applied. For example, it is applicable to manage the LSB (t) bits of the cluster address in the own track (see FIG. 6).

WC High-Density Information Table 26

The WC high-density information table 26 is used for managing track information of a high-density track (i.e., percentage of valid clusters in one track is equal to a specific percentage or larger) to be written in the MS 11. The WC high-density information table 26 manages the WC track information of high-density tracks and the number of the high-density tracks.

WC Low-Density Information Table 27

The WC low-density information table 27 is used for managing track information of a low-density track (i.e., percentage of valid clusters in one track is smaller than a specific percentage) to be written in the FS 12. The FS 12 manages a total number of clusters in low-density tracks.

Track Table 30 (Forward Lookup)

The track table 30 is used for acquiring track information based on a track address of LBA. The track information contains, for example, (1) a logical block address (information indicating a logical block in which data for a track is stored),
(2) a cluster directory number (information that is to be effective when at least a portion of data in a track is stored in either the FS 12 or the IS 13, and that indicates a table number of a cluster directory table for each track when data in the track is stored in either the FS 12 or the IS 13), and
(3) FS/IS cluster number (information that indicates how many clusters in the track are stored in either the FS 12 or the IS 13 and is used for determining whether to execute defragmentation).

Cluster Directory Table 31 (Forward Lookup)

The cluster directory table 31 is an intermediate table for searching for a logical block when data in a track is stored in either the FS 12 or the IS 13. The cluster directory table 31 is provided for each track. Cluster directory information registered in each of the cluster directory tables 31 contains an array of information indicating a table number of the cluster table 32 (cluster table number information). One piece of information among a plurality of pieces of the cluster table number information arrayed in one of the cluster directory tables 31 is selected based on upper several bits among LSB (t) bits of the cluster address of the LBA.

The cluster directory table 31 includes a cluster-directory LRU table 31a for managing a temporal order of the cluster directory information (an array of the cluster table number information) and a corresponding track address, based on a write time, based on LRU (Least Recently used), and in the form of a doubly-linked list, and a cluster-directory free-state information table 31b for managing a free cluster directory and a corresponding track address in the form of a doubly-linked list.

Cluster Table 32 (Forward Lookup)

The cluster table 32 is associated with the cluster directory table 31, and used for managing a storage location of data with respect to a logical block and a cluster position when the data in a track is stored in either the FS 12 or the IS 13. The cluster table 32 is indirectly referred to from the track table 30 via the cluster directory table 31. The cluster table 32 is actually an array of logical block addresses and cluster positions for a plurality of clusters. One piece of information among a plurality of pairs (the logical block and the cluster address) arrayed in one cluster table 32 is selected based on lower several bits among LSB (t) bits of the cluster address of the LEA. The cluster table 32 contains a number assigned to cluster block information (to be described later) and information about a cluster position in a cluster block identified by the cluster block information.

Cluster Block Information Table 33 (Reverse Lookup)

The cluster block is used for storing data in cluster units within a logical block. The cluster block information is used for managing logical blocks in the FS 12 and the IS 13, and indicates what clusters are contained in the logical block. The cluster block information is associated with one another in the form of a doubly-linked list in the FIFO order applied in the FS 12 and the IS 13.

The cluster block information contains
(1) a logical block address,
(2) the number of valid clusters, and
(3) LBA of clusters contained in the logical block.

The cluster block information table 33 includes a cluster block information table 33a for managing free-state information to manage cluster block information indicating a cluster block in a free state, a cluster block information table 33b for an FS for managing cluster block information contained in the FS 12, and a cluster block information table 33c for an IS for managing cluster block information contained in the IS 13. Each of the tables 33a to 33c is managed in the form of a doubly-linked list. The reverse-lookup address translation is used mainly for compaction in the IS 13, so that it is used to look up what clusters are stored in a logical block to be subjected to the compaction and to rewrite data in other storage area. In the first embodiment, the reverse-lookup address translation is used only for the FS 12 and the IS 13 that store therein data in cluster units.

Logical-to-Physical Translation Table 40 (Forward Lookup)

The logical-to-physical translation table 40 is used for managing translation between a logical block address and a physical block address and information concerning product life. The logical-to-physical translation table 40 contains information indicating a plurality of physical block addresses belonging to a logical block, information indicating number of times of erase processing performed on a logical block address, information indicating a number assigned to the cluster block information, and the like, for each logical block address. To rewrite data corresponding to certain LBA in other storage area, it is necessary to invalidate the LBA in an original cluster block. Therefore, it is necessary to search for a cluster block based on the LBA. To enable this search, management information of a logical block managed in the logical-to-physical translation table 40 contains identifiers of cluster block information.

(Snapshot and Log)

Due to the management information managed with the management tables described above, LBA used by the host 1, a logical NAND address used by the SSD 100 (i.e., a logical block address and an offset), and a physical NAND address used by the NAND memory 10 (i.e., a physical block address and an offset) can be associated with one another, so that data can be transmitted and received between the host 1 and the NAND memory 10.

NAND management tables for managing the NAND memory 10 among the management tables described above (i.e., the track table 30, the cluster directory table 31, the cluster table 32, the cluster block information table 33, and the logical-to-physical translation table 40 shown in FIG. 7) are stored in a specific area of the NAND memory 10 that is a nonvolatile memory. The management tables stored in the NAND memory 10 are loaded on a work area of the DRAM 20 that is a volatile memory at the time of startup, and the management tables are updated when the data managing unit 120 uses the loaded management tables. The management tables loaded on the DRAM 20 are referred to as master tables. When the power is turned off, the master tables need to be restored to states before the power is turned off. Therefore, a structure that can store the master tables in the NAND memory 10 that is a nonvolatile memory needs to be provided. The snapshot refers to all the nonvolatile management tables stored in the NAND memory 10, and a process of storing the master tables loaded on the DRAM 20 in the NAND memory 10 as they are is referred to as taking of the snapshot. The log represents an update difference resulted from updates of the management tables. If the snapshots are taken every time the master tables are updated, a processing speed decreases and the number of times of writing in the NAND memory 10 increases. To prevent such a situation, only the log representing the update difference is recorded in the NAND memory 10 in a normal state. A process of reflecting the log in the master tables and stores them in the NAND memory 10 is referred to as commitment.

Figure 8:
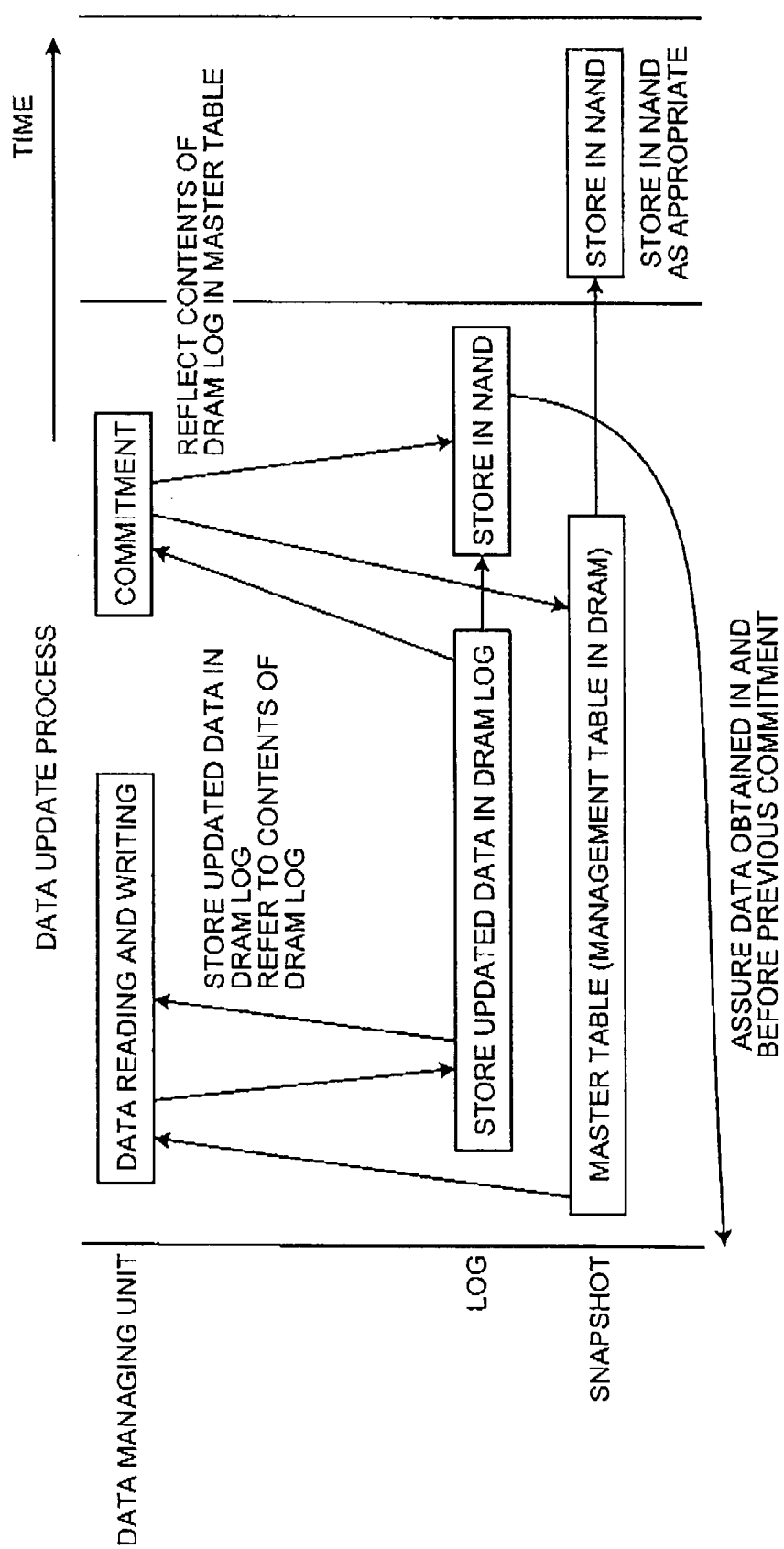
FIG. 8 is a schematic diagram illustrating a snapshot generation scheme and a log generation scheme.

FIG. 8 is a schematic diagram illustrating how the snapshot and the log are updated. The data managing unit 120 accumulates updated contents of the master tables in a log on the DRAM 20 (hereinafter, referred to as "a DRAM log") when updating data. Depending on types of the master tables, some master tables are updated directly and updated contents thereof are stored in the DRAM log, and other master tables are not updated directly while areas used for update are assured on the DRAM log and updated contents thereof are recorded in the areas. When data read processing and data write processing are performed, contents accumulated in the DRAM log are referred to as well as the master tables.

Once data update becomes stable, commitment of the log is executed. In commitment processing, contents of the DRAM log are reflected in the master tables as appropriate, and the contents of the DRAM log are stored in the NAND memory 10 to save the contents in a nonvolatile manner. The snapshot is stored in the NAND memory 10 when, for example, a storage area in the DRAM 20 for the log is run out during a normal power-off sequence. When writing of the log or the snapshot in the NAND memory 10 is completed, storing of the management tables in a nonvolatile manner is completed. A technology for storing management information in a nonvolatile manner as described above is disclosed in, for example, International Application No. PCT/JP2009/052597, which is filed by the same applicant as this application, and the entire contents of which are incorporated herein by reference.

Read Processing

Read processing is briefly explained below. When a Read command and LBA as a readout address are input by the ATA-command processing unit 121, the data managing unit 120 searches through the RC management table 23 and the WC track table 24 to determine whether data corresponding to the LBA is contained in either the WC 21 or the RC 22. When a search result indicates cache hit, the data managing unit 120 reads out the data corresponding to the LBA from either the WC 21 or the RC 22, and sends the data to the ATA-command processing unit 121.

When there is no data hit in the RC 22 and the WC 21, the data managing unit 120 searches for a storage area of the NAND memory 10 where the searched data is stored. When the data is stored in the MS 11, the data managing unit 120 refers to the LBA, the track table 30, and the logical-to-physical translation table 40 in this order to acquire the data stored in the MS 11. On the other hand, when the data is stored in the FS 12 or the IS 13, the data managing unit 120 refers to the LBA, the track table 30, the cluster directory table 31, the cluster table 32, and the logical-to-physical translation table 40 in this order to acquire the data stored in the FS 12 or the IS 13.

Write Processing (Processing in the WC 21)

Write processing is briefly explained below. In the write processing, when a Write command and LBA as a writing address are input from the ATA-command processing unit 121, data identified by the LBA is written in the WC 21. When there is no free space in the WC 21, some data is flushed from the WC 21 to be written in the NAND memory 10 by reference to DRAM management tables for managing the DRAM 20 among the above-mentioned management tables to generate a free space in the WC 21. A track containing valid clusters that account for a percentage smaller than a specific percentage of all clusters in the track is regarded as a low-density track, and to be flushed as cluster size data to the FS 12. When the FS 12 is set as a flush destination, valid clusters in the track are written in logical page units.

A track containing valid clusters that account for the specific percentage or larger of all clusters in the track is regarded as a high-density track, and to be flushed as track size data to the MS 11. When the MS 11 is set as a flush destination, the track size data is written as it is over the entire logical block. When two or more writing-target logical blocks are written, a double speed mode or bank interleaving is applied to improve a transfer efficiency. The DRAM management tables are updated according to data written in the WC 21 or data flushed to the NAND memory 10.

(Writing to the MS 11)

Figure 9:
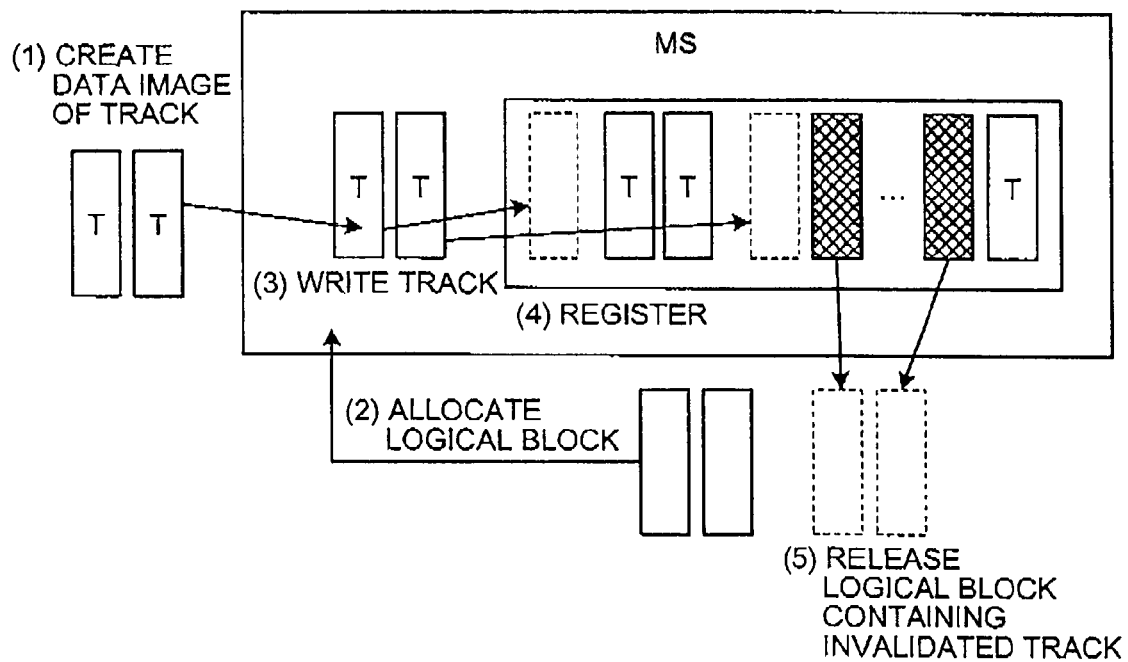
FIG. 9 is a schematic diagram illustrating a procedure of writing data in an MS.

Writing to the MS 11 is performed by a procedure described below with reference to FIG. 9.

1. A data image of a track is generated in the DRAM 20 (padding processing). In other words, data in a cluster that is not stored in the WC 21 or a cluster having a sector that is not stored in the WC 21 is read out from the NAND memory 10, and the read out data is merged with data in the WC 21.

2. A logical block (a track block) for the MS 11 is allocated from the CFB. The track block is used for storing data in track units among logical units.

3. The generated data image of the track is written in the allocated logical block.

4. Track information is looked up based on LEA of the track. The track information and a logical block address of the logical block into which the data image is written are associated with each other. The track information and the logical block address are registered in a specific NAND management table.

5. Old data in the WC 21 and the NAND memory 10 is invalidated.

(Writing to the FS 12)

Figure 10:
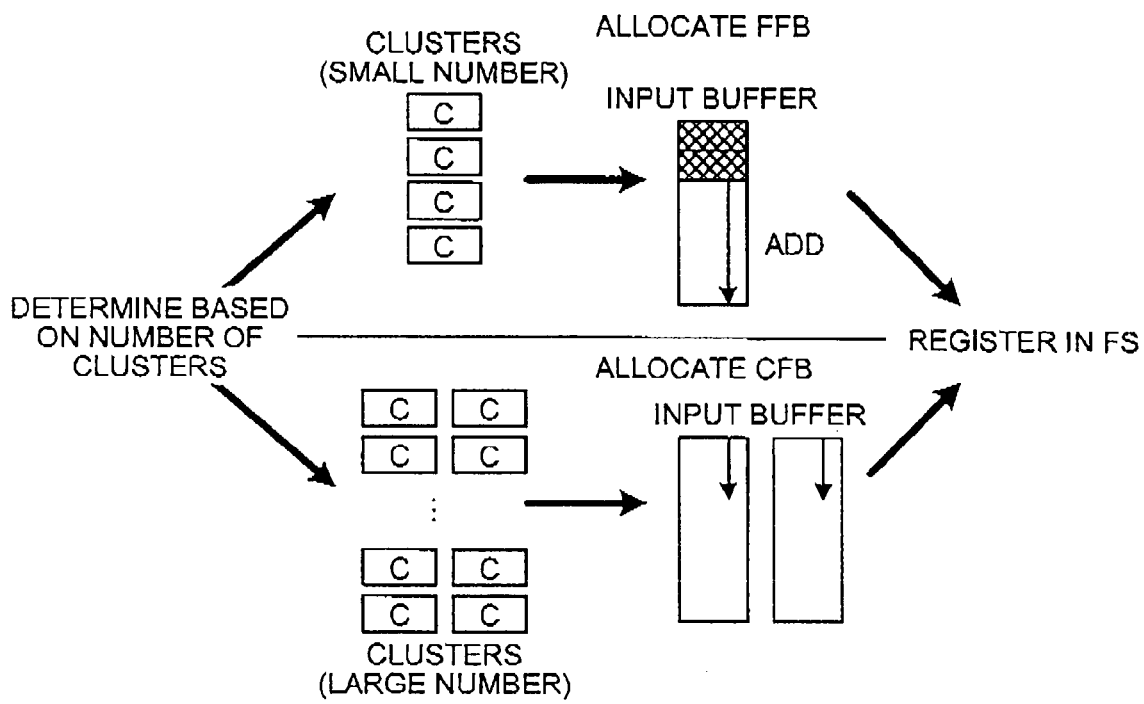
FIG. 10 is a schematic diagram illustrating writing of data in an FS.

Writing to the FS 12 is performed in such a manner that a data image of a cluster is generated in the DRAM 20 (padding processing) and then writing is performed in logical page units with respect to a newly-allocated logical block (a cluster block) using the pseudo SLC mode. Regarding allocation of a logical block, a fragment free block (FFB) having a writable logical page larger than the data image to be written is primarily allocated, and if such an FFB is not assured, a complete free block (CFB) is allocated. Writing to the FS 12 is performed by a procedure described below with reference to FIG. 10.

In the following description, a logical block (a cluster block) allocated for writing data of a low-density track from the WC 21 to the FS 12 is referred to as an Input Buffer (hereinafter, "FSIB").

1. When the total data amount of a low-density track input from the WC 21 is small, that is, when the number of valid clusters is smaller than a specific threshold, an FFB into which the data can be written is allocated as the FSIB.

2. When the total data amount of the low-density track sent from the WC 21 is large, that is, when the number of the valid clusters is equal to or larger than the specific threshold, a CFB is allocated as the FSIB. At this time, a plurality of logical blocks into which data can be written in parallel is allocated as the FSIB.

3. A data image of a cluster to be written is generated in the DRAM 20. In other words, for a cluster having a sector that is not stored in the WC 21, data of the sector that is not stored in the WC 21 is read out from the NAND memory 10, and the read out data is merged with data in sectors of the WC 21.

4. Clusters in the WC 21 and the cluster image generated in a work area are written in the FSIB.

5. The FSIB is added to a list of the FS 12.

6. The written track is re-inserted into the bottom end of the cluster-directory LRU table 31*a*.

(Movement from the FS 12 to the IS 13)

Figure 11:
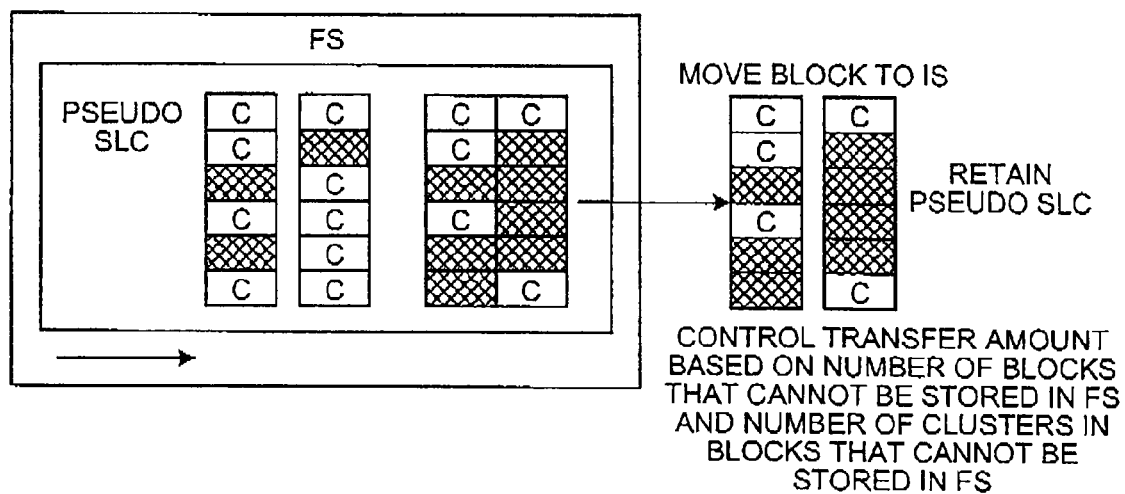
FIG. 11 is a schematic diagram illustrating a block transfer from an FS to an IS.

When the number of logical blocks managed in the FS 12 exceeds a specific maximum number of the logical blocks, as shown in FIG. 11, logical blocks that cannot be stored in the FS 12 are moved as they are to the IS 13. The number of logical blocks to be moved in one processing unit is determined according to the following rule based on the number of valid clusters in the logical blocks that cannot be stored in the FS 12.

Logical blocks in the FS 12 are added in order from oldest as candidates of the logical blocks to be moved so that the number of clusters in the logical blocks that cannot be stored in the FS 12 can be near a boundary of capacity of one logical block in the MLC mode. The reason why the number is set near the boundary of the capacity of one logical block is that it is desired to accommodate as many of valid clusters as possible in a logical block after compaction.

When the number of clusters exceeds the maximum number of clusters that can be simultaneously subjected to compaction in the IS 13, the number of blocks is set so that the number of clusters can be set within the maximum number of clusters that can be simultaneously subjected to the compaction in the IS 13.

An upper limit value of the number of blocks to be moved is set.

(Compaction and Defragmentation in the IS 13)

In the IS 13, when the number of logical blocks managed in the IS exceeds the maximum number of logical blocks, data transfer to the MS 11 (i.e., defragmentation processing) and compaction processing are performed to reduce the number of the logical blocks to be equal to or below the maximum number. When a data erasing unit (i.e., a logical block) and a data management unit (i.e., a cluster) are different from each other, and if data rewriting in the NAND memory 10 is farther performed, logical blocks may be fragmented because of invalid data. If the number of such fragmented logical blocks increases, the number of logical blocks that can be actually used decreases, resulting in ineffective use of a storage area of the NAND memory 10. A process of collecting valid clusters and rewriting them in a different logical block is referred to as compaction. The defragmentation processing is a process of integrating clusters in the FS 12 and the IS 13 as a track and flushing the track to the MS 11.

A main part of the first embodiment, that is, a process of writing or reading out data having a specific pattern and in a size corresponding to a management unit of the NAND memory in or from the host is explained below.

Figure 12:
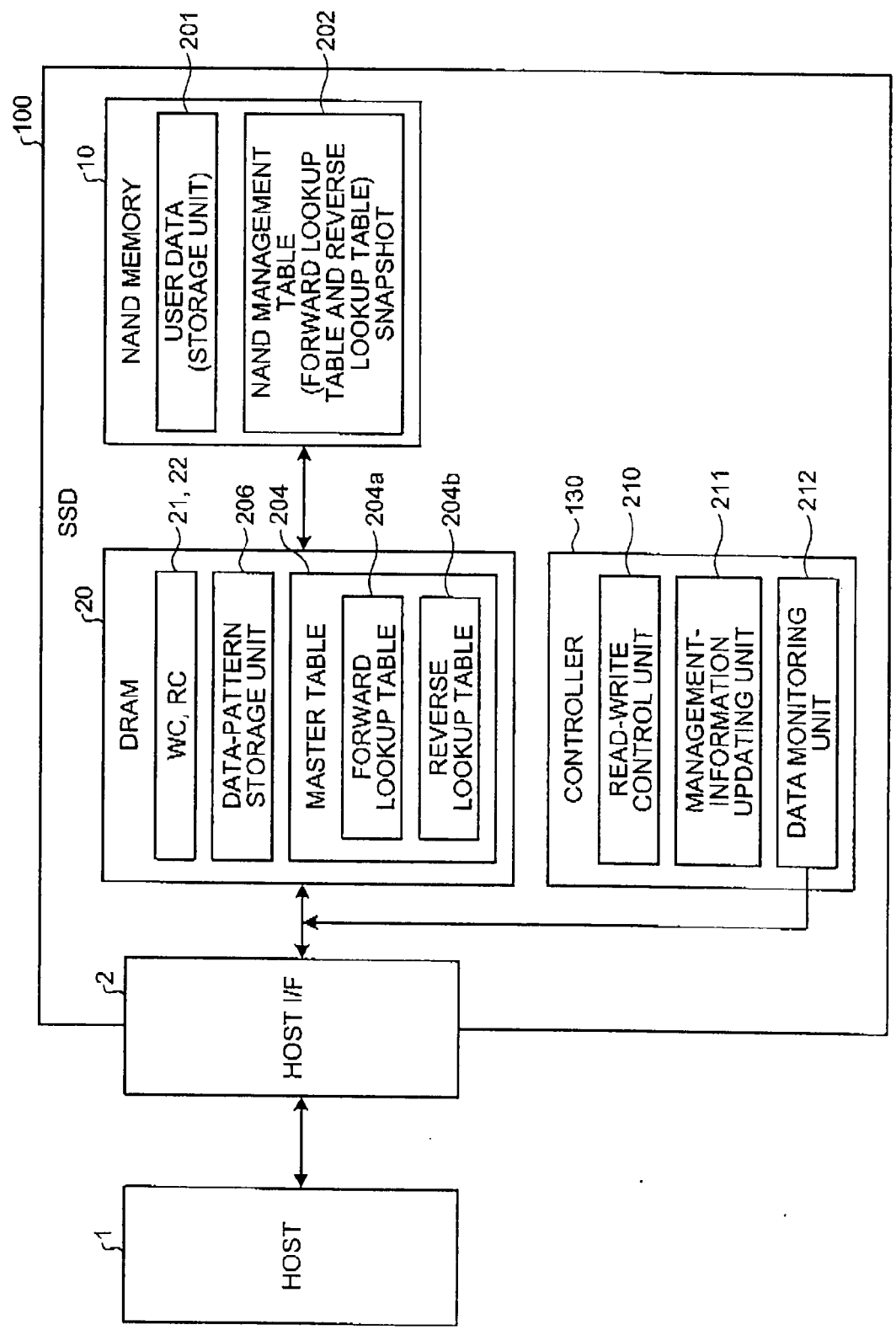
FIG. 12 is a block diagram of a functional configuration of a main part of a memory system according to a first embodiment of the present invention.

FIG. 12 is a block diagram of a functional configuration of a main part of a memory system according to the first embodiment. The memory system (SSD) 100 includes the ATA interface (host I/F) 2 that functions as an interface to the host 1, the NAND memory 10, the DRAM 20, and a controller 130.

The NAND memory 10 is used for storing, for example, a user data storage unit 201 for the MS 11, the FS 12, and the IS 13 in which user data is stored, and the NAND management tables (i.e., the track table 30, the cluster directory table 31, the cluster table 32, the cluster block information table 33, and the logical-to-physical translation table 40 shown in FIG. 7 and the log indicating differential information between a pre-update state and a post-update state of a master table 204 in the DRAM 20) that are stored as snapshots in a specific storage area of the NAND memory 10 other than the DRAM management tables among the management tables shown in FIG. 7.

The DRAM 20 is used for storing the WC 21, the RC 22, the master table 204 that is loaded on the DRAM 20 from a NAND management table 202, and a data-pattern storage unit 206 for storing data, which has a specific pattern and is written in the WC 21, and a write position of the data. The master table 204 includes, as described above, a forward lookup table 204*a* for executing the forward-lookup address translation and a reverse lookup table 204*b* for executing the reverse-lookup address translation.

The controller 130 includes a read-write control unit 210, a management-information updating unit 211, and a data monitoring unit 212. The read-write control unit 210 performs data reading/writing between the host 1 and the DRAM 20 and data reading/writing between the DRAM 20 and the NAND memory 10 based on the master table 204 and the data-pattern storage unit 206.

The management-information updating unit 211 reflects, when the DRAM management tables and the NAND management tables shown in FIG. 7 are updated, updates in the DRAM management tables and the NAND management tables, and performs processing for storing the updated NAND management tables in the NAND management table 202 of the NAND memory 10. When the data monitoring unit 212 detects that data having a specific pattern and in a management size of the NAND memory 10 is written in the WC 21, the management-information updating unit 211 stores the data in the data-pattern storage unit 206.

The data monitoring unit 212 monitors whether data written from the host 1 to the WC 21 has the specific pattern. When detecting the specific pattern, the data monitoring unit 212 outputs a detection result to the management-information updating unit 211. The data monitoring unit 212 can be configured by hardware or can be implemented by software.

In the following explanation, it is assumed that a data size used for detecting the specific pattern is set to a track size that corresponds to a management size of the NAND memory 10, and the specific pattern means a state in which all bits in a track are set to "0" (hereinafter, referred to as "all-zero state").

In the data-pattern storage unit 206, as described above, information indicating that all data bits are set to "0" is stored within a range corresponding to a track size from a certain address. Meanwhile, as shown in FIG. 7, data in the NAND memory 10 is managed by using the NAND management tables and data in the DRAM 20 is managed by using the DRAM management tables. Normally, both the NAND management tables and the DRAM management tables are loaded on the DRAM 20, and when data for which writing is instructed by the host 1 is written in the WC 21, a storage location of the data in the DRAM 20 is stored in the DRAM management tables. After data is written in the NAND memory 10 by the procedure for flushing the data from the WC 21 to the NAND memory 10 as described above, a storage location of the written data is stored in the NAND management tables.

In this example, writing in the NAND memory 10 is not performed when bits of data in a track unit are in the all-zero state. Therefore, a table for managing data in track units can be used for storing information about whether data written in the WC 21 is in the all-zero state. For example, the WC track information table 25 shown in FIG. 7 corresponds to such a table. Accordingly, the WC track information table 25 can be configured to function as the data-pattern storage unit 206 by being provided with a flag (specific pattern identification information) indicating whether data in a track is in the all-zero state.

Figure 13:
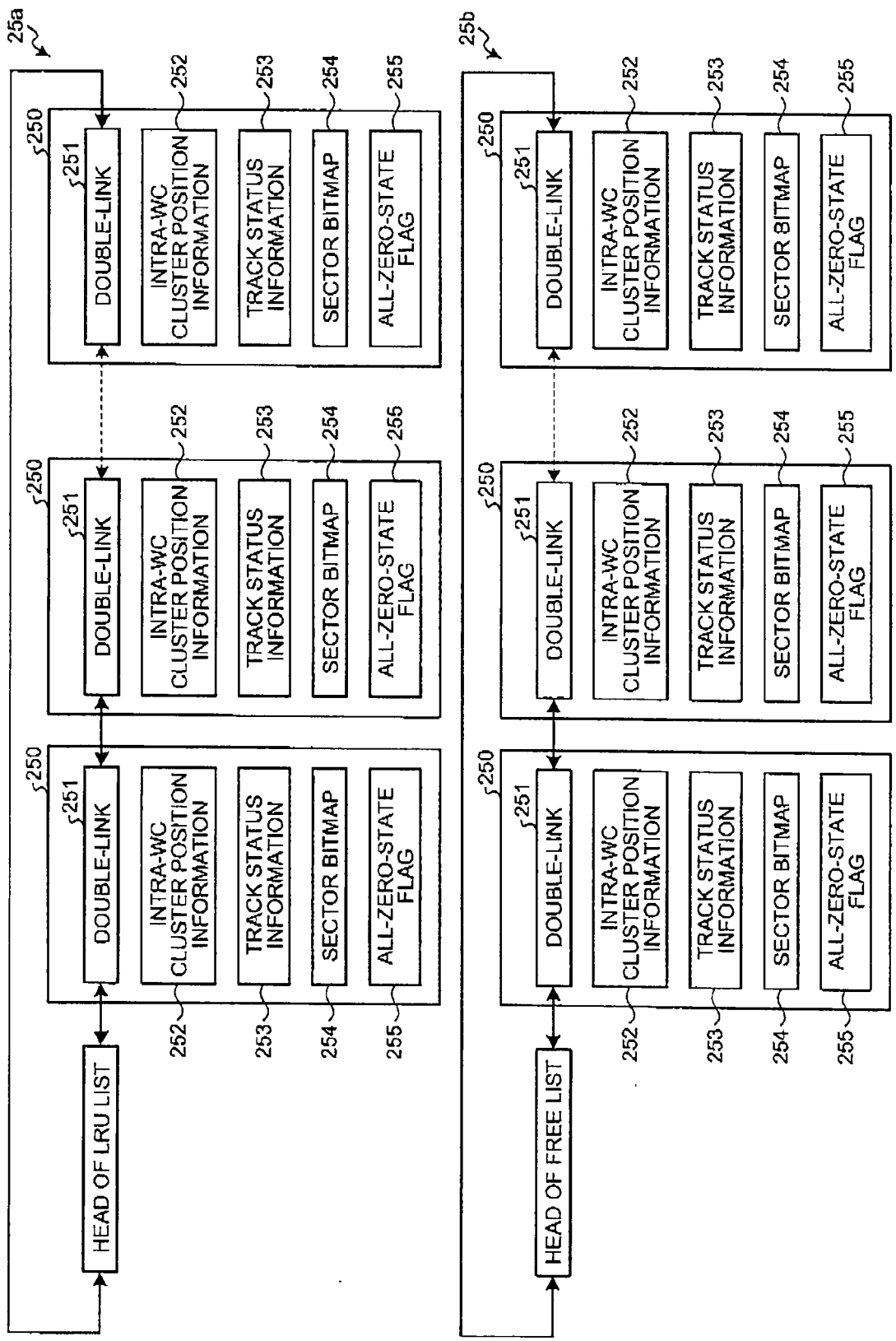
FIG. 13 is a schematic diagram of an example of a structure of WC track information.

FIG. 13 is a schematic diagram of an example of a configuration of WC track information. As described above, the WC track information table 25 includes the WC-track LRU information table 25*a* and the WC-track free-state information table 25*b*. The WC-track LRU information table 25*a* manages WC-accessed WC track information 250 in chronological order based on LRU and in the form of a doubly-linked list with a head of an LRU list at the head thereof. Similarly, the WC-track free-state information table 25*b* manages the WC track information 250 indicating a WC track in a free state in the form of a doubly-linked list with a head of a free list at the head thereof.

The WC track information 250 in the WC-track LRU information table 25*a* and the WC-track free-state information table 25*b* contains a double-link 251 that functions as a pointer from WC track information at a pre-stage to WC track information at a post-stage, an intra-WC cluster position information 252 that indicates the number of clusters stored in the WC 21 among clusters in a track and positions of the clusters in the WC 21, a track status information 253 that indicates a status of a track, a sector bitmap 254 that indicates a valid sector in a cluster, and an all-zero-state flag 255 that indicates whether there is the all-zero state. The all-zero-state flag 255 is activated when data in the WC track is in the all-zero state and deactivated when data in the WC track is not in the all-zero state. An initial value of the all-zero-state flag 255 of the WC track information 250 is set to active.

The read-write control unit 210 includes a function of stopping, when flush processing from the WC 21 to the NAND memory 10 is performed, writing, in the NAND memory 10, (association to a logical block) data that has been written in the WC 21 and stored in the data-pattern storage unit 206 as data having the specific data pattern. When an address of a track in the all-zero state is read out, the read-write control unit 210 refers to the track table 30 based on LBA. Because the track table 30 contains the address of the track in the all-zero state in association with an invalid address, which will be described later, the read-write control unit 210 returns data in the all-zero state by reading out the invalid address.

The management-information updating unit 211 performs processing for reflecting data stored in the WC 21, the RC 22, and the NAND memory 10 in the master table 204 and processing for recording the data in the NAND management table 202. When data that has been identified as data having the specific pattern by the management-information updating unit 211 is written in the WC 21, the management-information updating unit 211 stores, in the data-pattern storage unit 206, information indicating that data having the specific data pattern has been written. More specifically, the management-information updating unit 211 performs processing for activating the all-zero-state flag 255 of WC track information in the WC track information table 25 in which the written data (track) is managed. If a track contains at least one piece of data that is not in the all-zero state, the all-zero-state flag 255 is deactivated.

When performing flush processing to the NAND memory 10 on data for which the all-zero-state flag 255 is activated, the management-information updating unit 211 acquires, from the track table 30, track information corresponding to a track address that is obtained based on LBA of the data. Then, the management-information updating unit 211 performs processing for substituting a value of a logical block address that is associated with the track address based on the track information with an invalid address. At this time, the management-information updating unit 211 executes a function of deallocating a previously-allocated logical block and releasing data stored in the FS 12 and the IS 13 in the same track (i.e., a cluster).

A specific address space in which hardware used in the memory system is not present can be set as the invalid address. An address of an area that is previously allocated in the DRAM 20 and into which data having the specific pattern is written can be used instead of the invalid address.

Write processing performed when data requested to be written is in the all-zero state in a track is described in detail below.

(Writing of all-Zero Data from the Host 1 to the WC 21)

Figure 14:
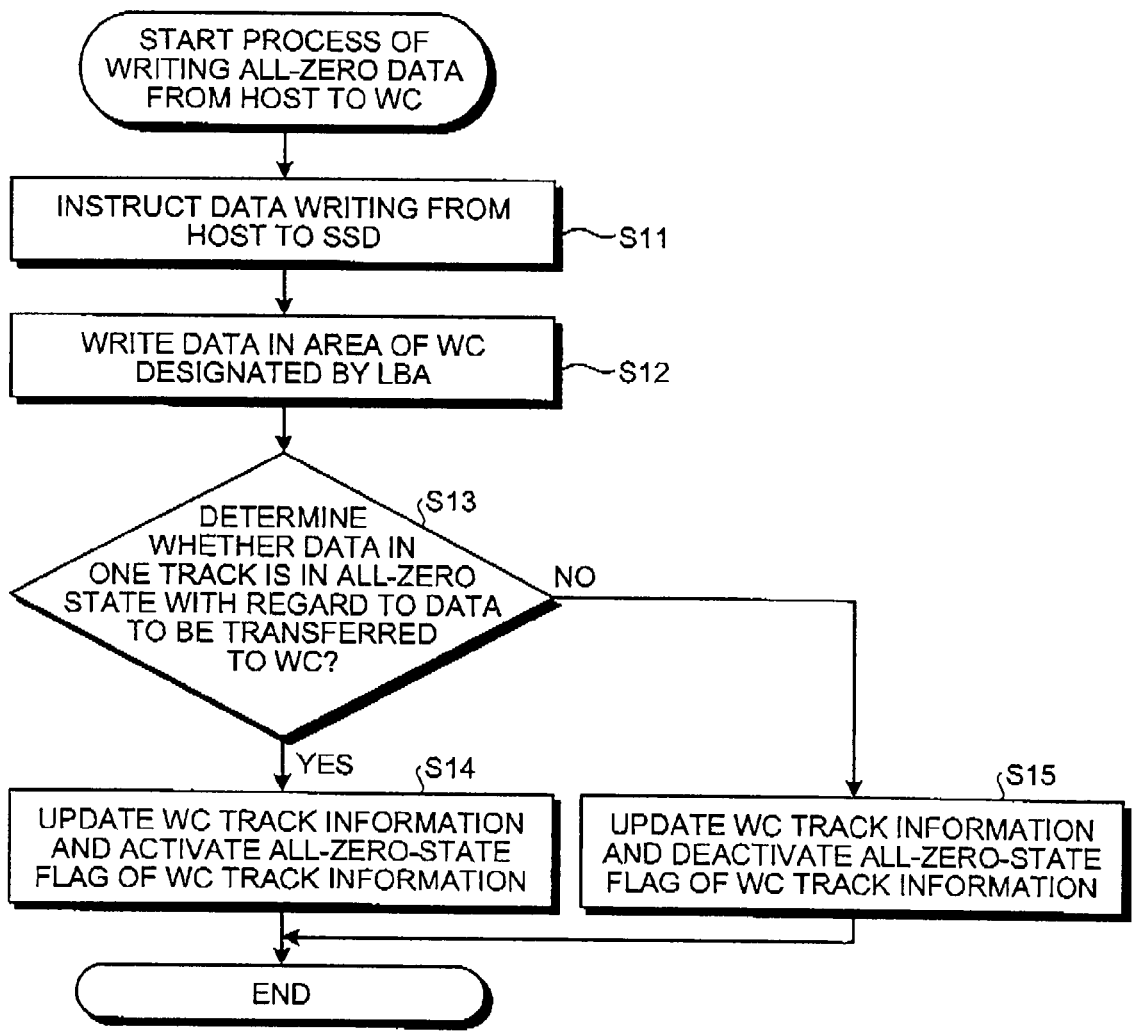
FIG. 14 is a flowchart of an exemplary procedure of a process of writing all-zero data from a host to a WC.

FIG. 14 is a flowchart of an exemplary procedure of a process of writing all-zero data (data in the all-zero state) from the host 1 to the WC 21.

1. When an instruction for writing data from the host 1 to the SSD 100 is issued (i.e., when a Write command and LBA as a writing address are input by the ATA-command processing unit 121) (Step S11), the read-write control unit 210 writes the data in an area of the WC 21 designated by the LBA (Step S12). When the data transferred to the WC 21 is in the all-zero state, the ATA-command processing unit 121 sends information indicating that the data is in the all-zero state to the controller 130 (processing within the controller 130).

2. At this time, the data monitoring unit 212 monitors data transferred from the ATA interface (host I/F) 2 to the DRAM 20 to determine whether the data in one track is in the all-zero state (Step S13).

3. The management-information updating unit 211 updates the DRAM management tables (i.e., the WC track information table 25) in response to writing of data in the WC 21. At this time, when a result at the above process 2 indicates that the data in one track is in the all-zero state, the management-information updating unit 211 activates the all-zero-state flag 255 of the WC track information 250 (Step S14), and process control ends. Otherwise, the management-information updating unit 211 deactivates the all-zero-state flag 255 (Step S15), and process control ends.

(Writing of all-Zero Data from the WC 21 to the MS 11)

Figure 15:
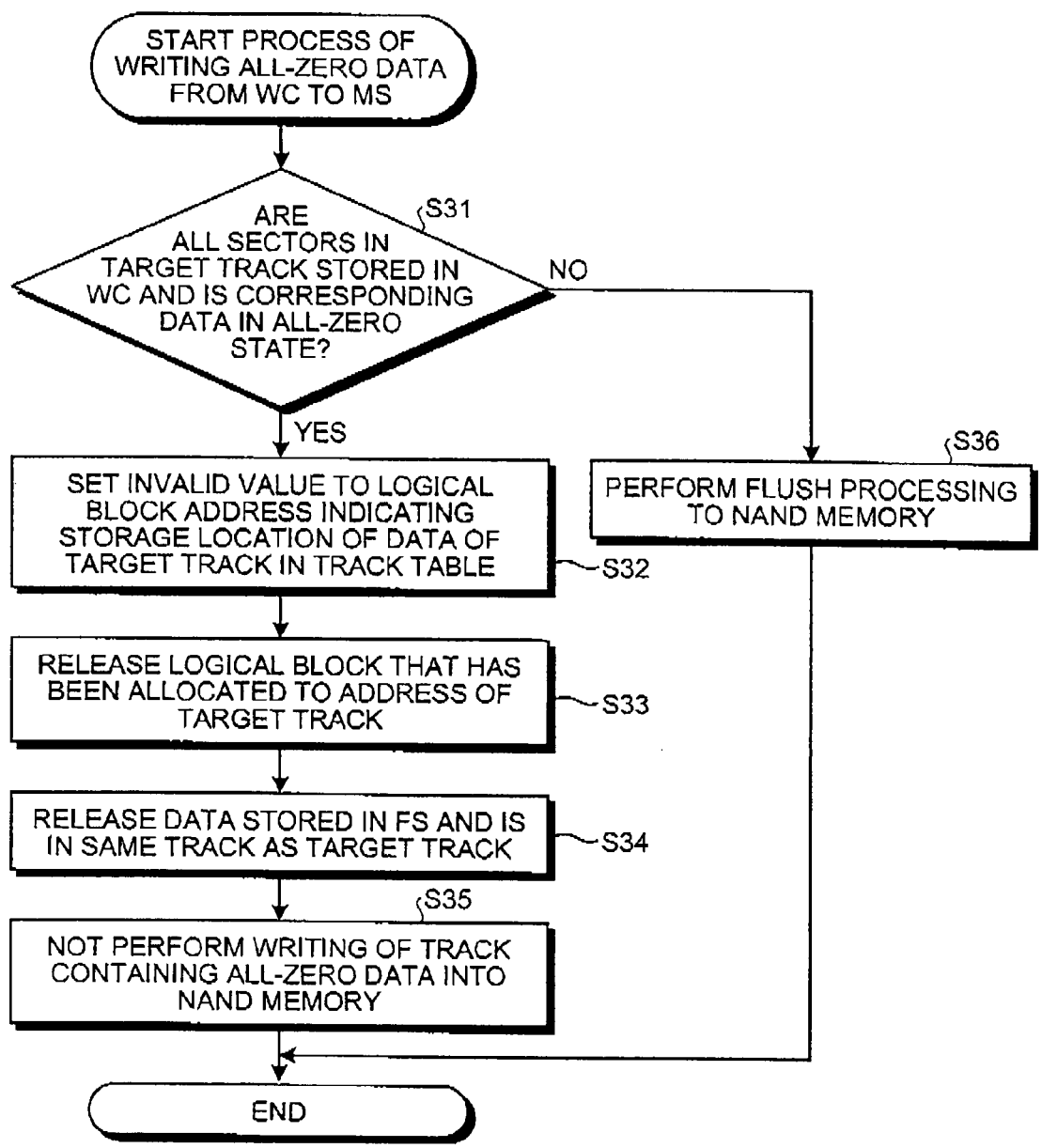
FIG. 15 is a flowchart of an exemplary procedure of a process of writing all-zero data from a WC to an MS.

FIG. 15 is a flowchart of an exemplary procedure of a process of writing all zero data from the WC 21 to the MS 11.

1. When there is no free space in the WC 21 and all-zero data written in the WC 21 (i.e., a track) is to be flushed to the MS 11, the management-information updating unit 211 determines whether the following condition is satisfied: all sectors in a target track are stored in the WC 21 and corresponding data is in the all-zero state. (Step S31).

2. When the above condition is satisfied (YES at Step S31), the management-information updating unit 211 manipulates the track table 30 that is provided as the NAND management table to set an invalid value to a logical block address indicating a storage location of the data of the target track (Step S32). The management-information updating unit 211 also releases a logical block that has been allocated to the address of the target track (Step S33). Similarly, the management-information updating unit 211 releases data stored in the FS 12 and the IS 13 in the same track as the target track (Step S34). On the other hand, when the above condition is not satisfied, flush processing is performed according to the flushing sequence as described above (Step S36).

3. The management-information updating unit 211 does not perform writing of a track containing all-zero data that has been stored in the WC 21 into the NAND memory 10 (Step S35), and process control ends.

Figure 16:
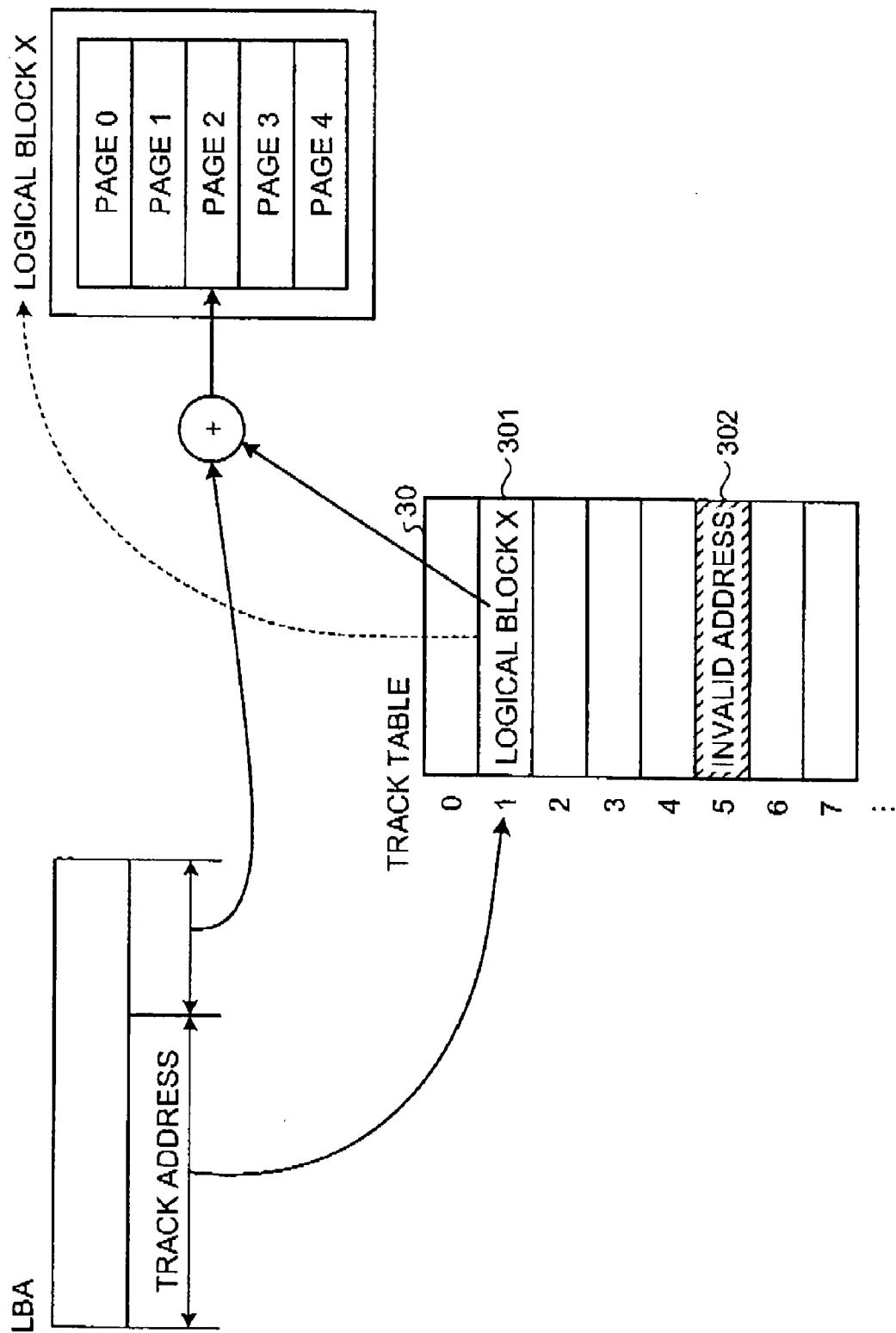
FIG. 16 is a schematic diagram illustrating Read processing.
Figure 17:
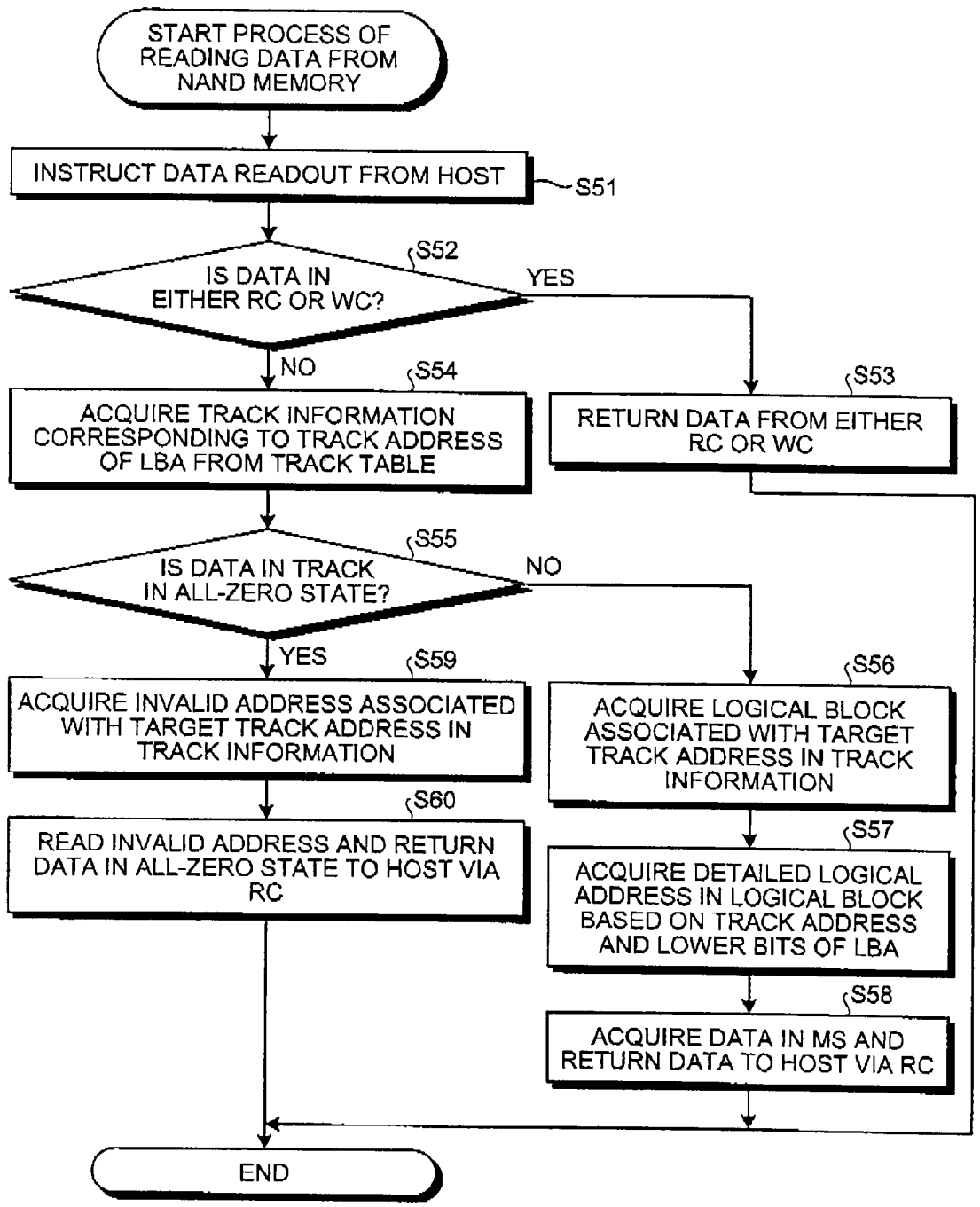
FIG. 17 is a flowchart of an exemplary procedure of a process of reading data from a NAND memory.

Read processing on data from the NAND memory 10 is described in detail below. FIG. 16 is a schematic diagram illustrating the Read processing. FIG. 17 is a flowchart of an exemplary procedure of a process of reading data from the NAND memory 10. In this example, it is assumed that an invalid address is set in track information 302 of the track table 30.

When a Read command and LBA as a readout address are input by the ATA-command processing unit 121 (Step S51), the controller 130 searches through the RC management table 23 and the WC track table 24. When the designated LBA is found in the RC 22 or the WC 21 (YES at Step S52), the controller 130 returns data from the RC 22 or the WC 21 in which the designated LBA is found to the host 1 (Step S53). On the other hand, when the designated LBA is not found in the RC 22 and the WC 21 (NO at Step S52), the controller 130 acquires track information corresponding to a track address of the LBA from the track table 30 functioning as the NAND management table (Step S54). Subsequent processes depend on whether data in a target track is in the all-zero state (Step S55).

Explanation about a case where the data in the target track is not in the all-zero state (NO at Step S55) is given below. It is assumed that track information 301 is acquired as the track information corresponding to the track address at Step S54. In the track information 301, a logical block X is associated with the track address, so that the controller 130 acquires the logical block X based on the track address (Step S56). Then, the controller 130 acquires a detailed logical address in the logical block X based on the track address and lower bits of the LBA (Step S57). The controller 130 then acquires data in the MS 11 and returns the data to the host 1 via the RC 22 (Step S58), and then process control ends.

Explanation about a case when the data in the target track is in the all-zero state (YES at Step S55) is given below. Similarly to the above-described case, it is assumed that the track information 302 is acquired as the track information corresponding to the track address at Step S54. In the track information 302, an invalid address is associated with the track address (Step S59). In other words, the controller 130 returns data in the all-zero state to the host 1 via the RC 22 by reading the invalid address in the track information 302 of the track table 30 (Step S60). In this manner, the process is completed.

While it is described that writing in the NAND memory 10 is stopped when all bits of data in the track are set to "0", the present invention is not limited to this example. For example, the present invention can be applied, in the same manner, to a case where all bits of data in a track are set to "1" instead of "0". It is also possible to stop writing in the NAND memory 10 when all bits of data in a track are uniformly set to either "0" or "1".

Furthermore, while it is described that writing in the NAND memory 10 is stopped when all bits of data in the track are set to "0", the same processing can be preformed on data in other units corresponding to the management unit of the NAND memory 10. For example, because data in the NAND memory 10 is managed in both track units and in cluster units set to be smaller than the track units in the above example, it is possible to use data in cluster units such that writing in the NAND memory 10 is stopped when all bits of data in a cluster are uniformly set to "0" and/or "1."

Moreover, while it is described that the data monitoring unit 212 is configured to monitor data sent from the host I/F 2 to the DRAM 20, it is applicable to configure the data monitoring unit 212 to check data having the specific patterns and written in the DRAM 20 (the WC 21) or to monitor data sent from the DRAM 20 to the NAND controller 112.

Furthermore, it is described that, when data in the all-zero state is written from the WC 21 to the MS 11 and if all sectors in a target track are stored in the WC 21 and corresponding data is in the all-zero state, writing of the data in the NAND memory 10 is stopped. However, it is applicable to stop writing in the NAND memory 10 in the same manner when the data is in the all-zero state after padding processing is performed through reading from the NAND memory 10 even if all sectors of the track are not stored in the WC 21.

According to the first embodiment, when data is written from the WC 21 to the NAND memory 10, if the data to be written has a size equal to the address management unit of the NAND memory 10 and has a specific data pattern, the data is not written in the NAND memory 10 while information indicating that the data has the specific data pattern (i.e., the all-zero state) is recorded in the management information. Therefore, compared to a case where the data itself is written to the NAND memory 10, processing speed can be increased. Furthermore, in subsequent reading out, it is possible to detect that the data has the specific data pattern (i.e., the all-zero state) based on the management information without reading out the data corresponding to the address from the NAND memory 10. Therefore, compared to a case where the data itself is read from the NAND memory 10, processing speed can be further increased. As a result, performance of the memory system can be improved.

Furthermore, when the data written in the WC 21 has the specific data pattern, the data is not written in the NAND memory 10, so that the number of times of erase processing can be reduced. Moreover, the data normally written in the NAND memory 10 is not written in the NAND memory 10, so that a more space of the NAND memory 10 can be assured. Therefore, the number of FBs can be increased and an idle time of each of the physical blocks in the NAND memory 10 can be increased, resulting in improved relaxation effect. As a result, lifetime of the NAND memory 10 can be lengthened.

[Second Embodiment]

Figure 18:
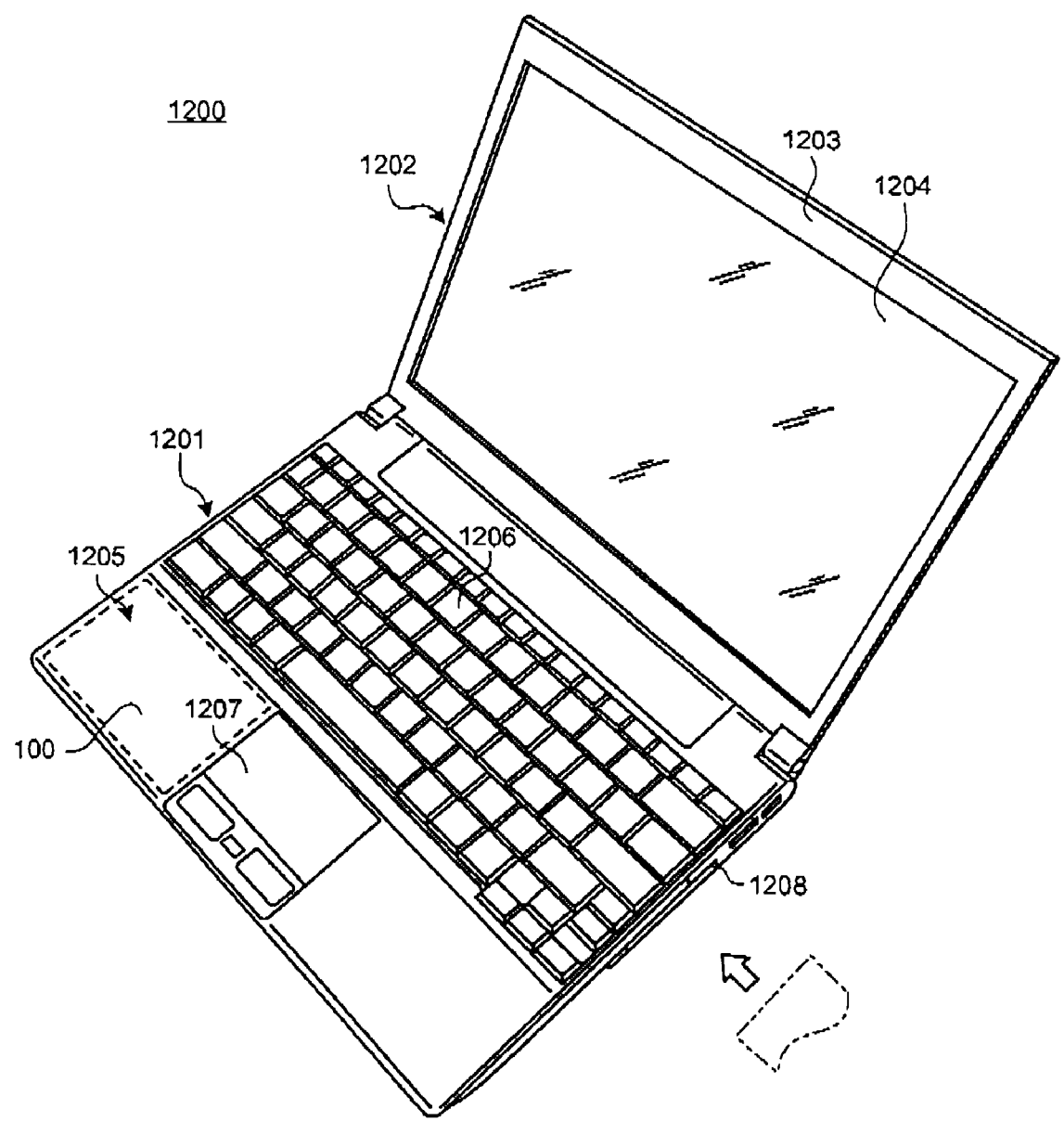
FIG. 18 is an overall view of a personal computer equipped with the SSD.

FIG. 18 is a perspective view of a personal computer 1200 equipped with the SSD 100. The personal computer 1200 includes a main body 1201 and a display unit 1202. The display unit 1202 includes a display housing 1203 and a display device 1204 accommodated in the display housing 1203.

The main body 1201 includes a chassis 1205, a keyboard (KB) 1206, and a touch pad 1207 as a pointing device. The chassis 1205 accommodates a main circuit board, an ODD (Optical Disk Device) unit, a card slot, and the SSD 100.

The card slot is arranged adjacent to the peripheral wall of the chassis 1205. The peripheral wall has an opening 1208 facing the card slot. A user can insert and remove an additional device into and from the card slot from outside the chassis 1205 through the opening 1208.

The SSD 100 can be used instead of the conventional HDD in the state of being mounted in the personal computer 1200 or can be used as an additional device in the state of being inserted into the card slot of the personal computer 1200.

Figure 19:
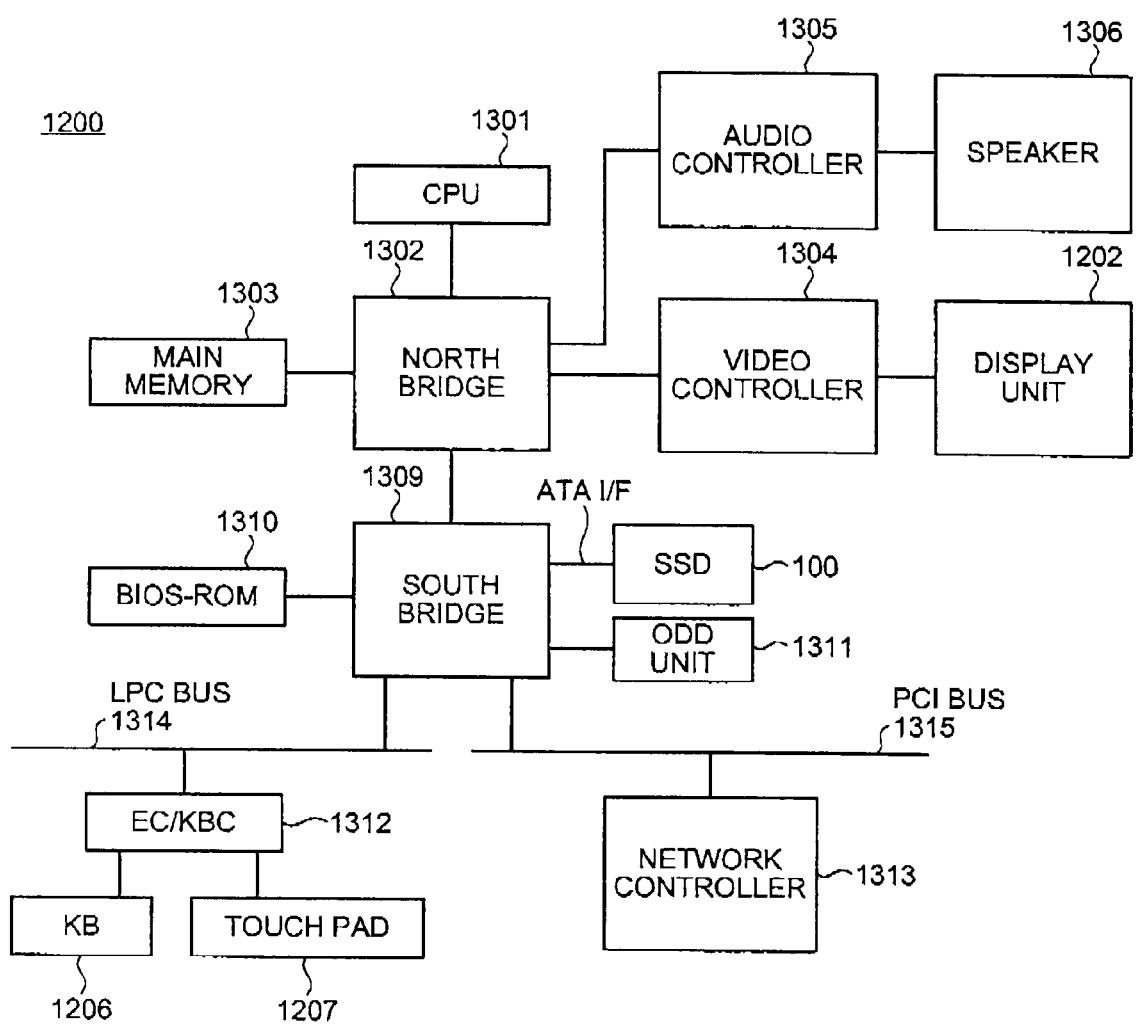
FIG. 19 is a schematic diagram of an example of a system architecture in the personal computer equipped with the SSD.

FIG. 19 is a schematic diagram of an example of a system architecture in the personal computer 1200 equipped with the SSD 100. The personal computer 1200 includes a central processing unit (CPU) 1301, a north bridge 1302, a main memory 1303, a video controller 1304, an audio controller 1305, a south bridge 1309, a BIOS-ROM 1310, the SSD 100, an ODD unit 1311, an embedded controller/keyboard controller (EC/KBC) IC 1312, and a network controller 1313.

The CPU 1301 is a processor for controlling an operation of the personal computer 1200, and executes an operating system (OS) loaded from the SSD 100 to the main memory 1303. The CPU 1301 executes these processes when the ODD unit 1311 executes one of reading process and writing process with an attached optical disk.

The CPU 1301 also executes a system BIOS (Basic Input Output System) stored in the BIOS-ROM 1310. The system BIOS is a computer program for controlling hardware of the personal computer 1200.

The north bridge 1302 is a bridge device that connects the local bus of the CPU 1301 to the south bridge 1309. The north bridge 1302 accommodates a memory controller (not shown) for controlling an access to the main memory 1303.

The north bridge 1302 has a function of executing a communication between the video controller 1304 and the audio controller 1305 via an AGP (Accelerated Graphics Port) bus.

The main memory 1303 temporarily stores therein computer programs or data, and functions as a work area of the CPU 1301. The main memory 1303 is formed of, for example, DRAM.

The video controller 1304 is a video reproduce controller for controlling the display unit 1202 used as a display monitor of the personal computer 1200.

The audio controller 1305 is an audio reproduce controller for controlling a speaker 1306 of the personal computer 1200.

The south bridge 1309 controls devices connected to an LPC (Low Pin Count) bus 1314, and controls devices connected to a PCI (Peripheral Component Interconnect) bus 1315.

The south bridge 1309 controls the SSD 100 that functions as a memory device for storing various software and data, via the ATA interface.

The personal computer 1200 executes an access to the SSD 100 in sector units. For example, a write command, a read command, and a cache flash command are input to the SSD 100 via the ATA interface.

The south bridge 1309 has a function of controlling an access to the BIOS-ROM 1310 and the ODD unit 1311.

The EC/KBC 1312 is a one-chip microcomputer that is integrated on the embedded controller for controlling power supply, and the key board controller for controlling the KB 1206 and the touch pad 1207.

The EC/KBC 1312 has a function of setting ON/OFF of the power supply of the personal computer 1200 based on the operation of a power button by a user. The network controller 1313 is, for example, a communication device that executes communication to the network such as the Internet.

According to an embodiment of the present invention, it is possible to provide a memory system, a controller, and a method of controlling the memory system capable of preventing degradation caused by increase in the number of times of data writing in a nonvolatile semiconductor memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A memory system comprising:
a volatile first storing unit;
a nonvolatile second storing unit; and
a controller that transfers data between a host apparatus and the second storing unit via the first storing unit, wherein
the first storing unit stores therein first management information used for correlating a logical address designated by the host apparatus with a data storage location in the first storing unit, and second management information used for correlating the logical address and a data storage location in the second storing unit,
the controller further includes
a read-write control unit that performs data reading and data writing between the host apparatus and the first storing unit and between the first storing unit and the second storing unit, by using the first management information and the second management information;
a management-information updating unit that updates the first or the second management information when the data storage location in the first or the second storing unit is changed by the read-write control unit; and
a data monitoring unit that monitors whether data written in the first storing unit from the host apparatus has a specific pattern with respect to each specific management unit, wherein
when the data monitoring unit detects that data having the specific pattern is written in the first storing unit, the management-information updating unit adds specific pattern identification information indicating that the data has the specific pattern to the first management information corresponding to the data, and
when data written in the first storing unit is flushed to the second storing unit, and if the specific pattern identification information is added for the data, the read-write control unit does not write the data in the second storing unit, and the management-information updating unit sets an invalid address value to the second management information corresponding to the data.

2. The memory system according to claim 1, wherein when a logical address designated by the host apparatus is associated with the invalid address value set to the second management information, the read-write control unit returns data having the specific pattern and associated with the invalid address value to the host apparatus via the first storing unit without reading data from a data storage location associated with the logical address of the second storing unit.

3. The memory system according to claim 1, wherein the specific pattern corresponds to a state where all bits of data in the management unit are uniformly set to either zero or one.

4. The memory system according to claim 1, wherein the management-information updating unit sets, as the invalid address value, an address value that is not associated with hardware used in the memory system.

5. The memory system according to claim 1, wherein the data monitoring unit monitors data sent between the host apparatus and the first storing unit.

6. The memory system according to claim 1, wherein the data monitoring unit monitors data written in the first storing unit.

7. The memory system according to claim 1, wherein the data monitoring unit monitors data sent between the first storing unit and the controller.

8. The memory system according to claim 1, wherein
the first storing unit is a dynamic random access memory, and
the second storing unit is a NAND type flash memory.

9. A controller that transfers data between a host apparatus and a nonvolatile second storing unit via a volatile first storing unit, the controller comprising:
a read-write control unit that performs data reading and data writing between the host apparatus and the first storing unit and between the first storing unit and the second storing unit, by using first management information used for correlating a logical address designated by the host apparatus with a data storage location in the first storing unit and second management information used for correlating the logical address with a data storage location in the second storing unit;

a management-information updating unit that updates the first or the second management information when the data storage location in the first or the second storing unit is changed by the read-write control unit; and a data monitoring unit that monitors whether data written in the first storing unit from the host apparatus has a specific pattern with respect to each specific management unit, wherein when the data monitoring unit detects that data having the specific pattern is written in the first storing unit, the management-information updating unit adds specific pattern identification information indicating that the data has the specific pattern to the first management information corresponding to the data, and when data written in the first storing unit is flushed to the second storing unit, and if the specific pattern identification information is added for the data, the read-write control unit does not write the data in the second storing unit, and the management-information updating unit sets an invalid address value to the second management information corresponding to the data.

10. The controller according to claim 9, wherein when a logical address designated by the host apparatus is associated with the invalid address value set to the second management information, the read-write control unit returns data having the specific pattern and associated with the invalid address value to the host apparatus via the first storing unit without reading data from a data storage location associated with the logical address in the second storing unit.

11. The controller according to claim 9, wherein the specific pattern corresponds to a state where all bits of data in the management unit are uniformly set to either zero or one.

12. The controller according to claim 9, wherein the management-information updating unit sets, as the invalid address value, an address value that is not associated with hardware used in the memory system.

13. The controller according to claim 9, wherein the data monitoring unit monitors data sent between the host apparatus and the first storing unit.

14. The controller according to claim 9, wherein the data monitoring unit monitors data written in the first storing unit.

15. The controller according to claim 9, wherein the data monitoring unit monitors data sent between the first storing unit and the controller.

16. A method of controlling a memory system that includes a volatile first storing unit and a nonvolatile second storing unit comprising:
   transferring data between a host apparatus and the second storing unit via the first storing unit;
   performing data reading and data writing between a host apparatus and the first storing unit and between the first storing unit and the second storing unit, by using first management information being used for correlating a logical address designated by the host apparatus with a data storage location in the first storing unit and second management information being used for correlating the logical address with a data storage location in the second storing unit;
   updating the first or the second management information when the data storage location in the first or the second storing unit is changed at the performing;
   monitoring whether data written in the first storing unit from the host apparatus has a specific pattern with respect to each specific management unit;
   adding, when it is detected at the monitoring that data having the specific pattern is written in the first storing unit, specific pattern identification information indicating that the data has the specific pattern to first management information corresponding to the data; and
   setting, when data written in the first storing unit is flushed to the second storing unit and if the specific pattern identification information is added for the data, an invalid address value to the second management information corresponding to the data without writing the data in the second storing unit.

17. The method according to claim 16, further comprising returning, when a logical address designated by the host apparatus is associated with the invalid address value set to the second management information, data having the specific pattern and associated with the invalid address value to the host apparatus via the first storing unit without reading data from a data storage location associated with the logical address in the second storing unit.

18. The method according to claim 16, wherein the specific pattern corresponds to a state where all bits in data in the management unit are uniformly set to either zero or one.

19. The method according to claim 16, further comprising setting, as the invalid address value, an address value that is not associated with hardware used in the memory system.

20. The memory system according to claim 16, further comprising monitoring data sent between the host apparatus and the first storing unit.

* * * * *